(12) United States Patent
Fujii

(10) Patent No.: US 6,591,780 B2
(45) Date of Patent: Jul. 15, 2003

(54) FEED CARRYING APPARATUS

(75) Inventor: Kazumi Fujii, Maebashi (JP)

(73) Assignee: Fujii Shokai Co., Ltd., Gunma (JP)

( * ) Notice: Subject to any disclaimer, the term of this patent is extended or adjusted under 35 U.S.C. 154(b) by 0 days.

(21) Appl. No.: 09/788,366

(22) Filed: Feb. 21, 2001

(65) Prior Publication Data

US 2001/0015177 A1 Aug. 23, 2001

(30) Foreign Application Priority Data

| Feb. 22, 2000 | (JP) | 2000-044889 |
| Mar. 24, 2000 | (JP) | 2000-084156 |
| Jun. 23, 2000 | (JP) | 2000-189795 |
| Sep. 7, 2000 | (JP) | 2000-271469 |
| Oct. 2, 2000 | (JP) | 2000-302652 |
| Oct. 3, 2000 | (JP) | 2000-304084 |

(51) Int. Cl.[7] .......................... A01K 5/00; A01K 39/01
(52) U.S. Cl. ........................... 119/57.4; 119/57.2
(58) Field of Search ....................... 119/57.4, 56.2, 119/57.1, 57.7, 901, 57.2

(56) References Cited

U.S. PATENT DOCUMENTS

| 3,176,655 A | * | 4/1965 | Reimers | 119/61 |
| 3,389,689 A | * | 6/1968 | Van Huis | 119/57.4 |
| 3,971,340 A | * | 7/1976 | Allen | 119/53 |
| 4,241,700 A | * | 12/1980 | Cobb | 119/57.4 |
| 4,301,768 A | * | 11/1981 | Osborn | 119/51.11 |
| 4,678,137 A | * | 7/1987 | Kincheloe | 242/352.4 |
| 5,097,797 A | * | 3/1992 | Van Zee et al. | 119/57.4 |
| 5,303,814 A | * | 4/1994 | Ohtsuji et al. | 198/659 |
| 5,513,597 A | * | 5/1996 | Pollock | 119/57.4 |
| 5,697,327 A | * | 12/1997 | Pollock | 119/57.4 |
| 5,782,201 A | * | 7/1998 | Wells | 119/56.1 |

* cited by examiner

Primary Examiner—Robert P. Swiatek
(74) Attorney, Agent, or Firm—Sughrue Mion, PLLC

(57) ABSTRACT

To provide a feed carrying apparatus 1 capable of considerably reducing the carrying resisting force at a corner 3a of a pipeline 3 and also capable of considerably reducing the cost of the whole apparatus, and capable of carrying feed S smoothly and efficiently. A corner joint 48 formed on a bent pipe part 51 with a plurality of projections 52 projecting inward is disposed at the corner 3a of the pipeline 3. There is disposed a disk cable tension applying mechanism 271 in which a load corresponding to weight of a weight 277 is loaded to always urge fixed tension against a disk cable 2. At a corner 303a of a pipeline 303 are disposed a drive device 304 having a drive motor 313 connected to a drive sprocket 316 constituting a corner joint 310, or a drive device 404 having a drive sprocket 410 arranged away from an inclined wall 409d within a casing 409 formed with the inclined wall 409d.

17 Claims, 41 Drawing Sheets

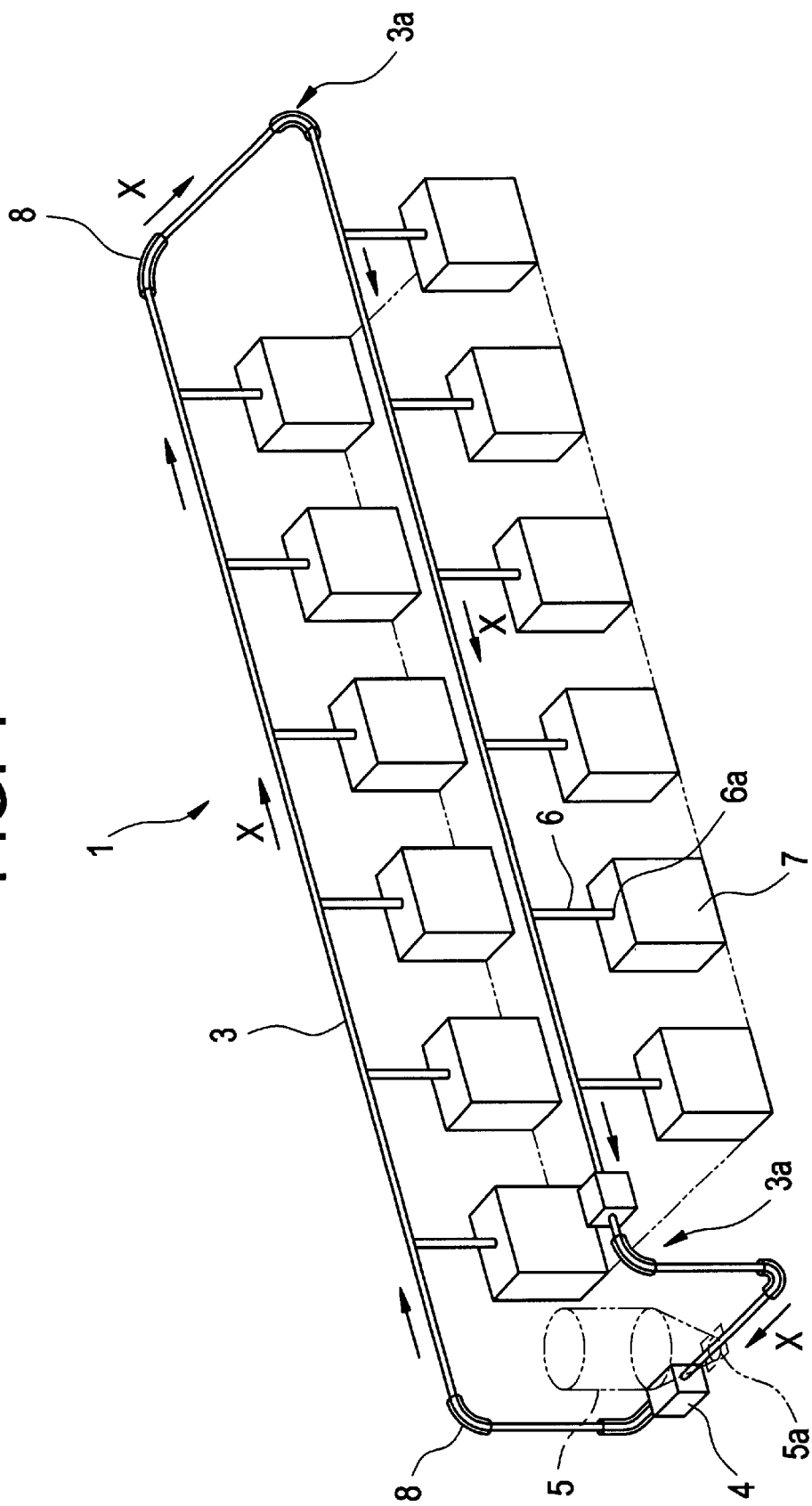

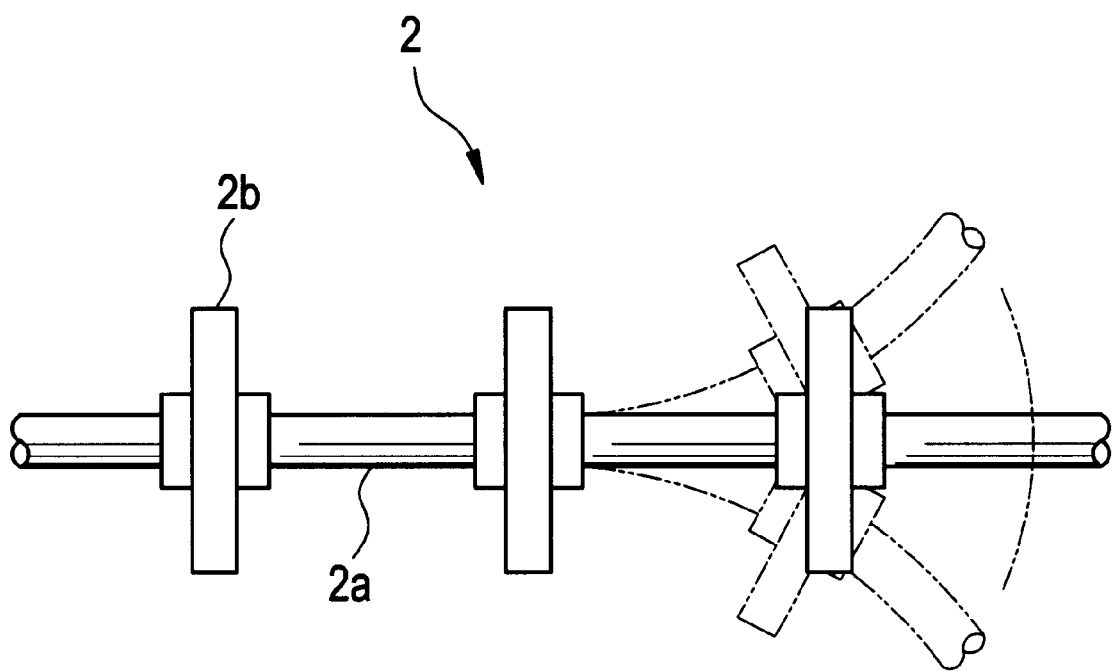

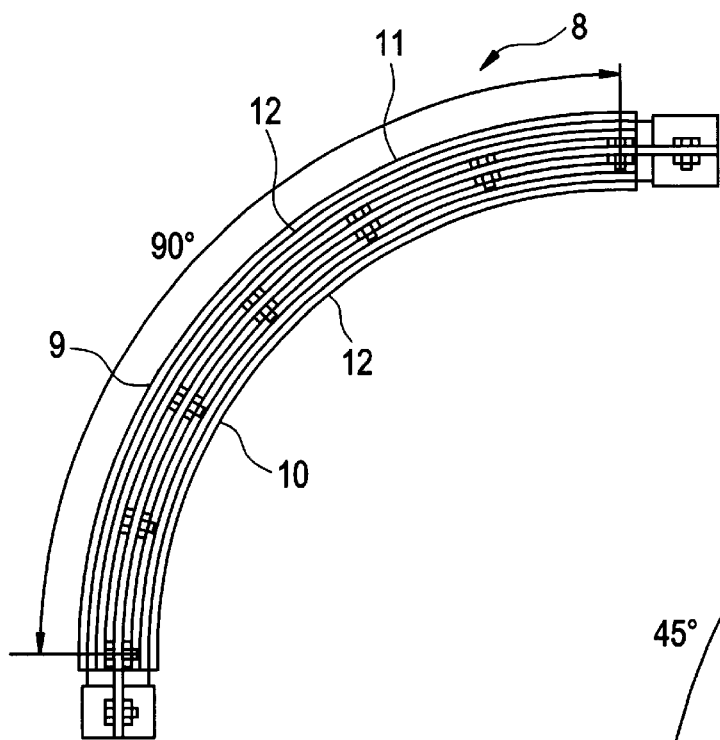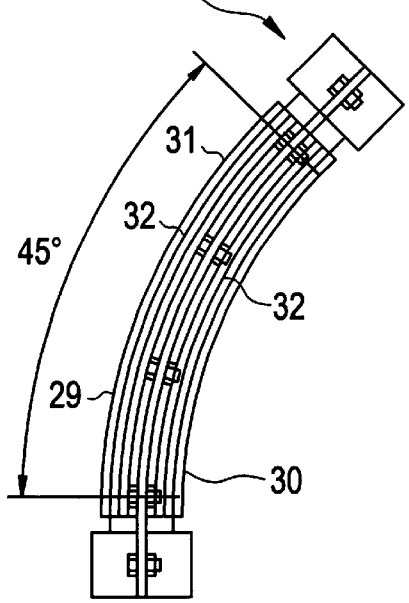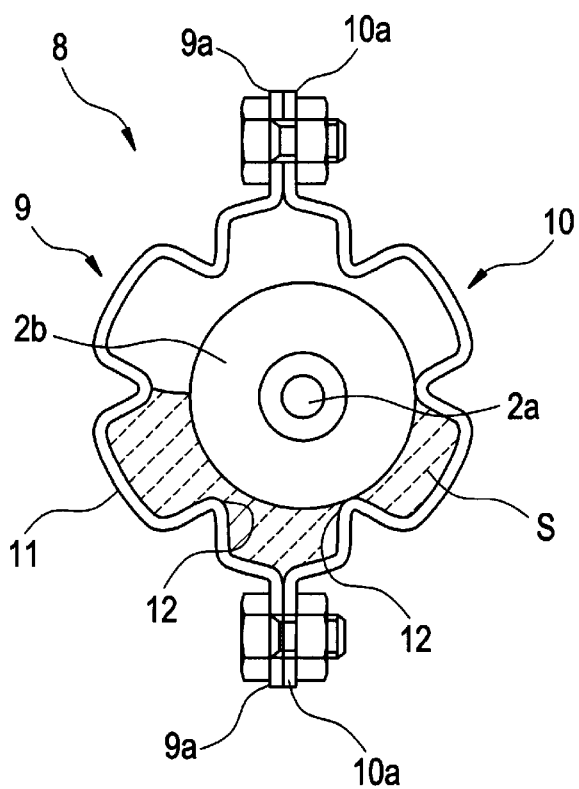

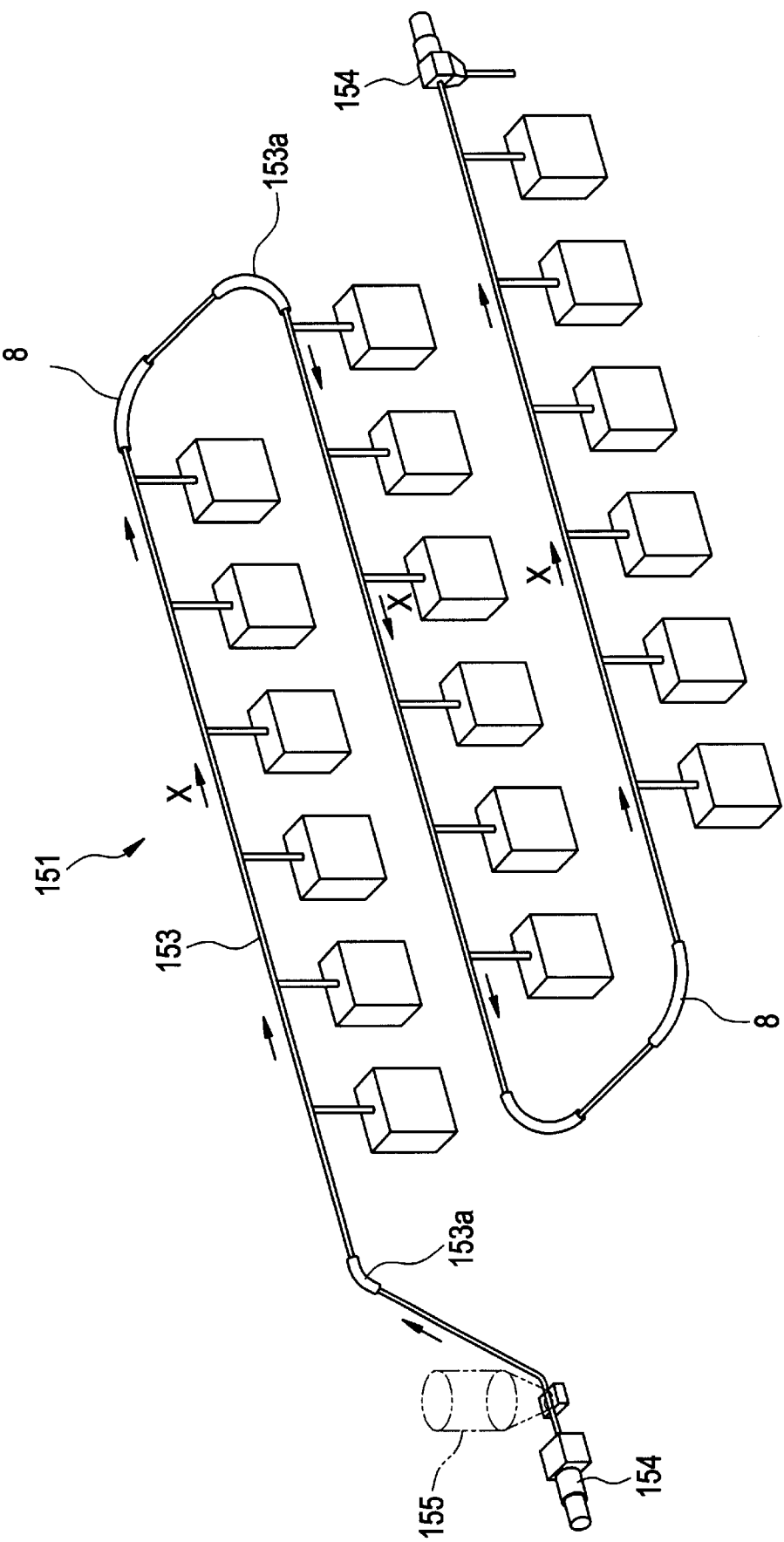

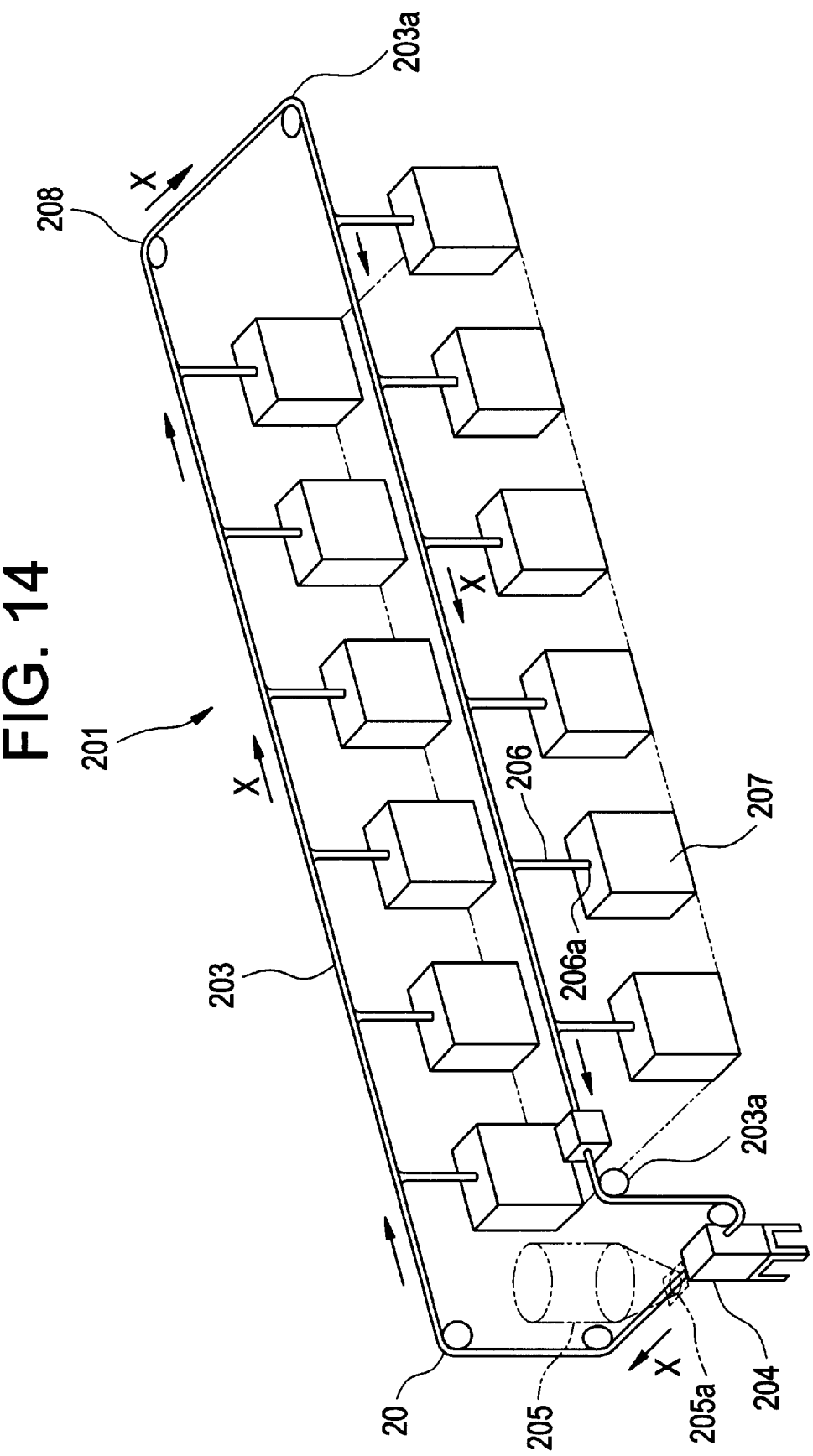

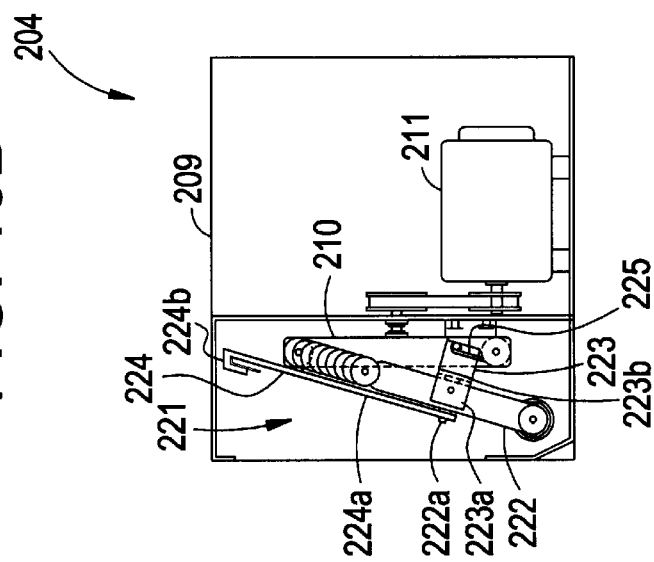
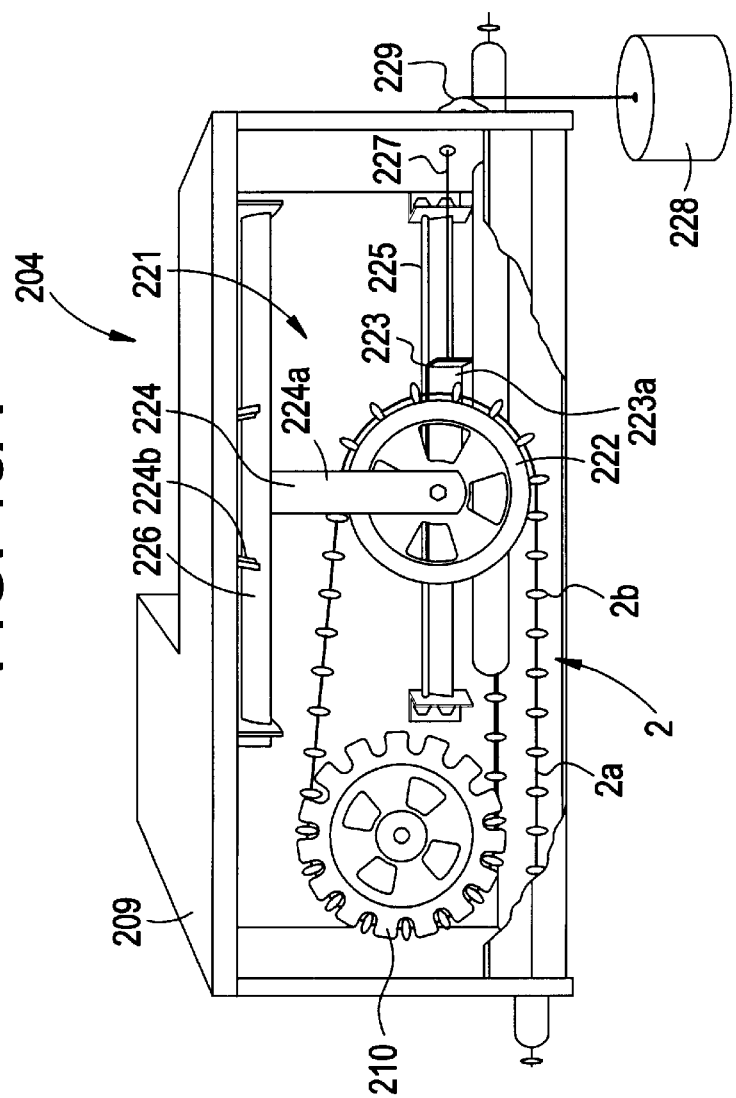

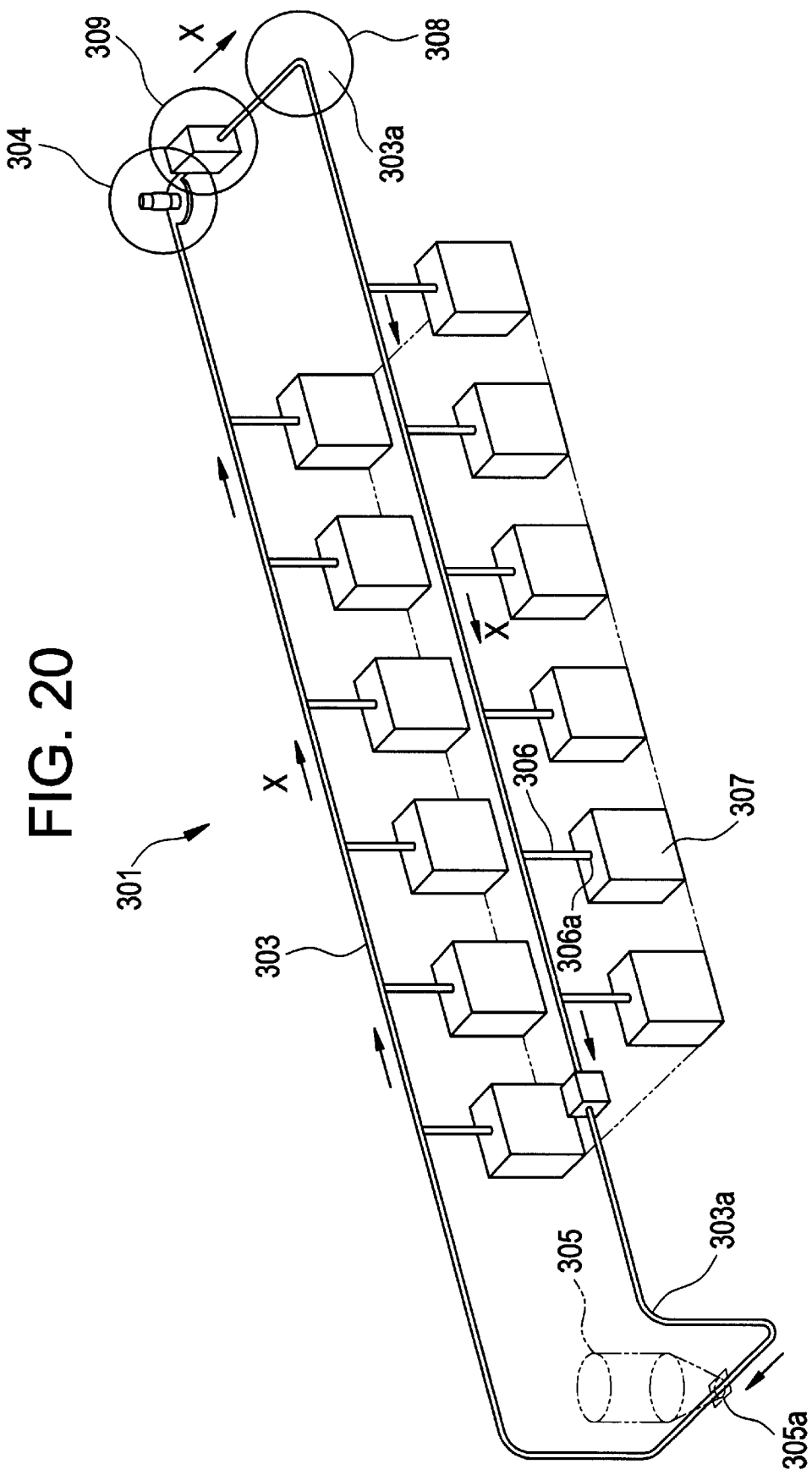

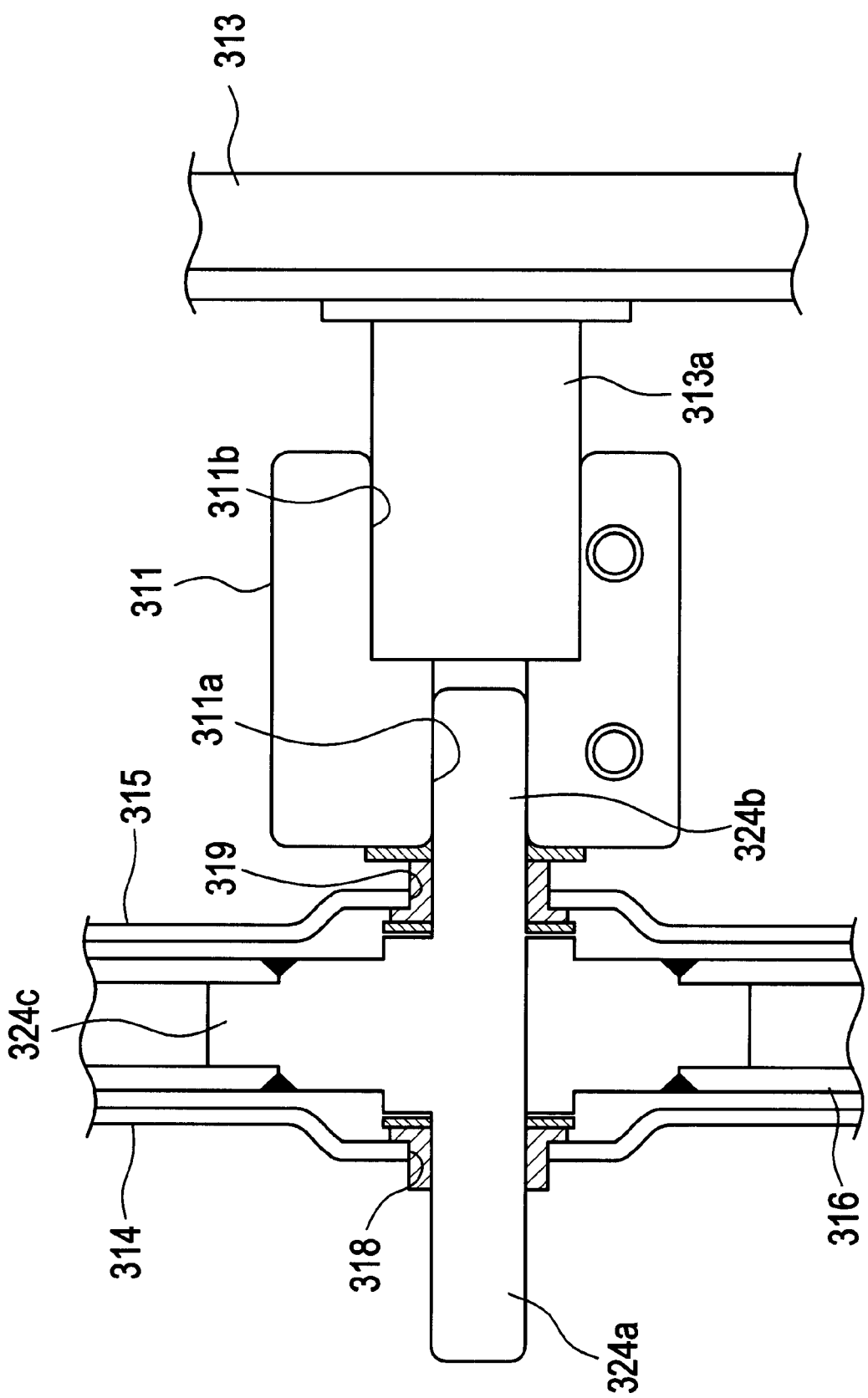

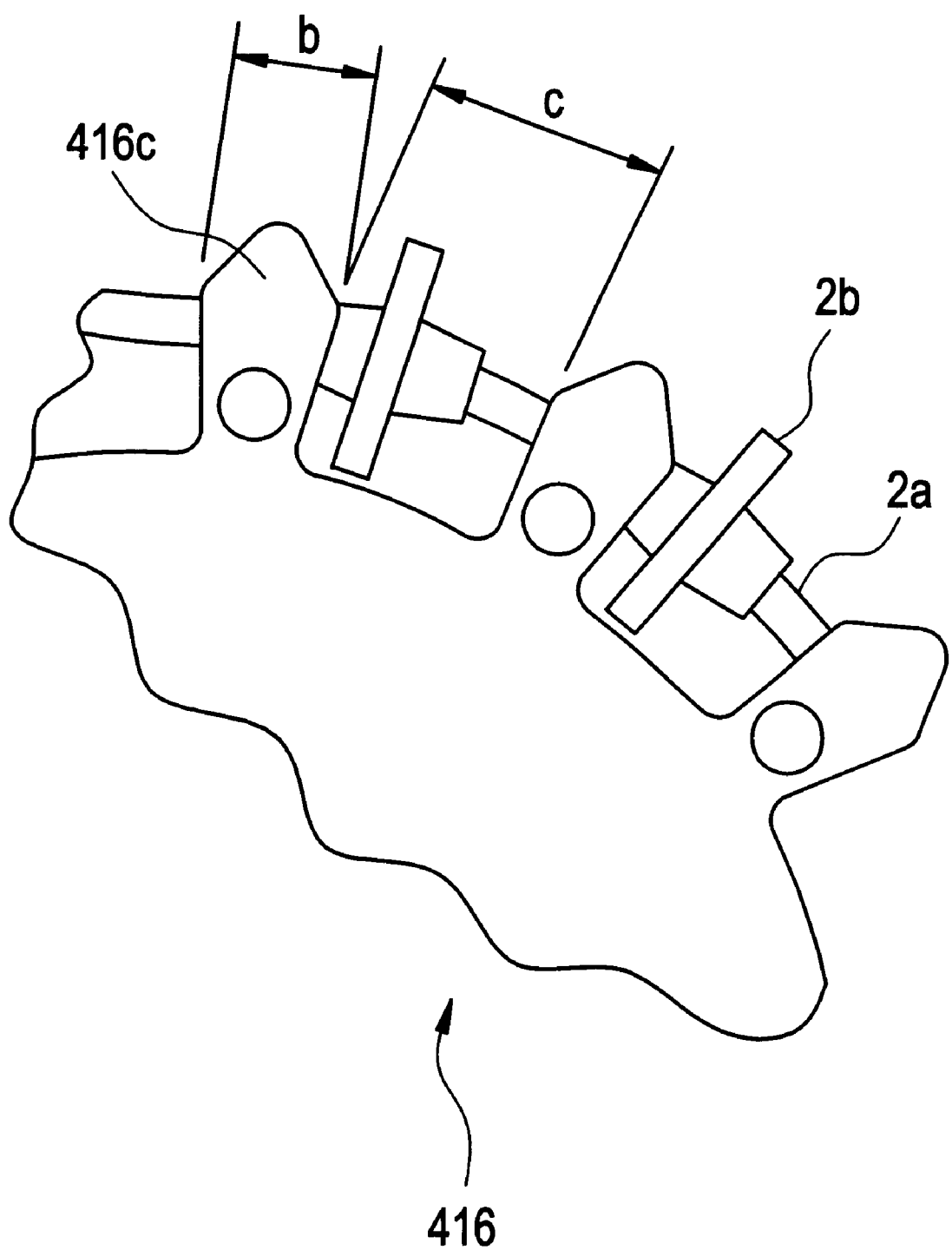

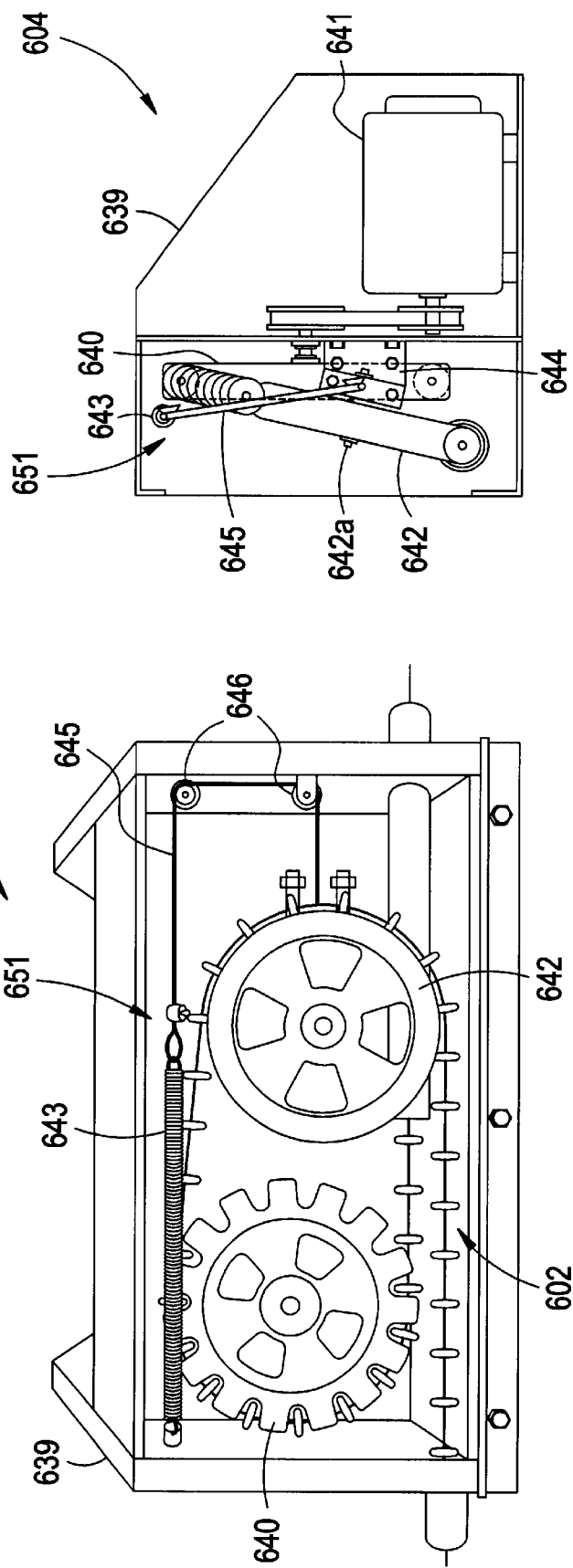

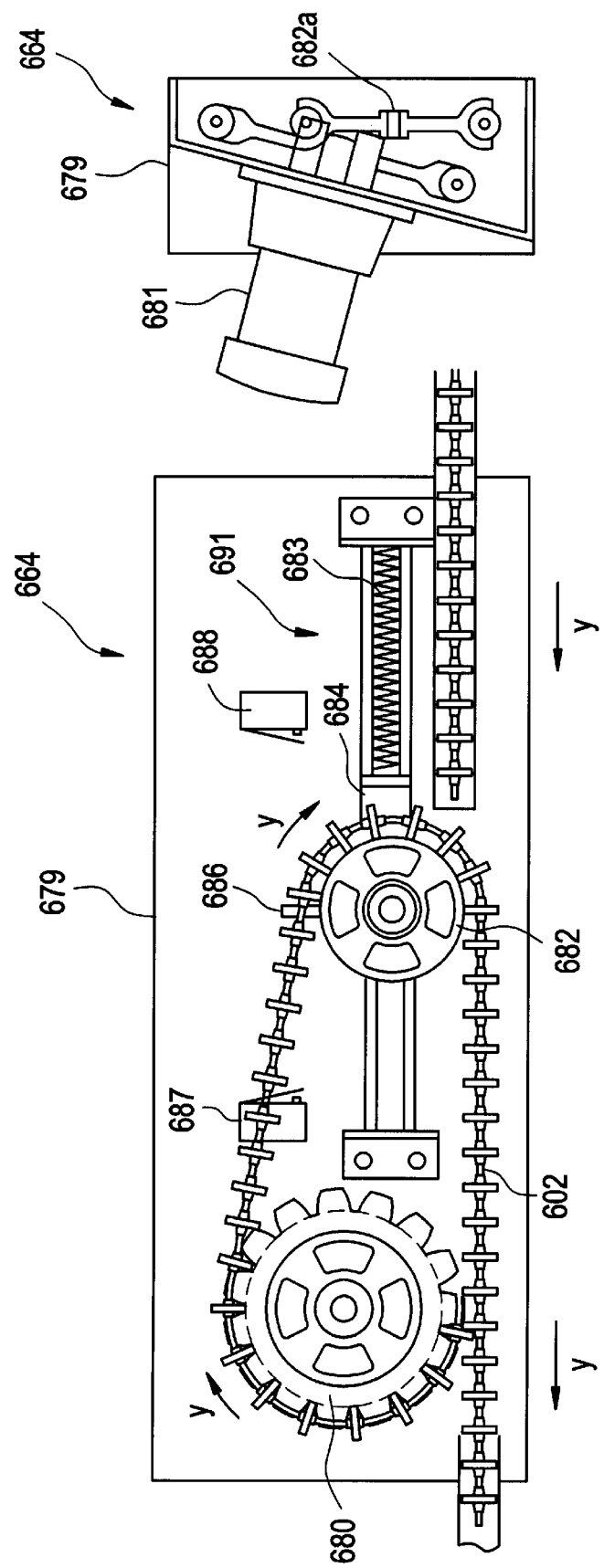

FEED CARRYING APPARATUS

BACKGROUND OF THE INVENTION

1. Field of the Invention

The present invention relates to a feed carrying apparatus for distributing feed for domestic animals to a number of feeding units through a pipeline from a feed hopper.

2. Related Art Statement

Various kinds of feed carrying apparatuses provided with pipelines have been heretofore known. Conventional systems include, for example, as shown in FIGS. 34 and 35, a system in which a pipeline 503 is provided at one end with a feed charging port from a feed hopper 505, and disposed at the other end with a driving device 504, whereby a centerless auger 502 which is housed in the pipeline 503 and connected to the driving device 504 is rotated by the driving device 504 to carry feed S within the pipeline 503 and feed S are fallen down into the feeding units 507 through feed falling-down pipes 506 from feed falling-down ports; and a system in which the centerless auger 502 is not rotated by the driving device 504 but forcibly fed to thereby carry feed S present between coils 502*a* of the centerless auger 502 within the pipeline 503.

In the system for carrying feed S making use of the centerless auger 502, however, a winding pitch of the coils 502*a* constituting the centerless auger 502 need be set as small as possible in order to maintain strength thereof. However, this poses a problem that when coarse compositions of feed S are contained in the coils 502*a* of the centerless auger 502, carrying becomes disabled.

In order to overcome the problem as described above, there has been known a disk cable system in which as shown in FIGS. 36 and 37, a disk cable 602 connected endlesswise is inserted into a pipeline 603, and the disk cable 602 is forcibly fed in a direction of arrow x by a driving device 604 to thereby carry feed S charged between disks 602*b* of the disk cable 602 from a feed hopper 605 and distribute them to feeding units 607 through feed falling-down pipes 606.

In the disk cable 602, as shown in FIG. 37, the disks 602*b* are secured to a flexible wire 602*a* in a fixed spaced relations.

In this disk cable system also, carrying resistance is great at corners 603*a* where the pipeline 603 is bent substantially at right angles (θ=90°) vertically or horizontally, and for reducing the resistance, corner joints 608 housing wheels 625 therein are disposed at the corners 603*a*, as shown in FIG. 38.

In the corner joint 608, as shown in FIG. 38, collars 619*a*, 620*a* and 619*b*, 619*b* of covers 619, 620 are placed in contact and fastened by bolts 621 and nuts 622 to thereby form a wheel receiving part 623 and a bent pipe part 624.

Further, in order to be able to reduce a great carrying resisting force at the corners 603*a*, a wheel 625 is rotatably supported by a rotational shaft 626 in the wheel receiving part 623, a disk cable 602 having disks 602*b* secured to a flexible wire 602*a* in a fixed spaced relations is inserted into the bent pipe part 624, and the disk 602*b* is placed in contact with the outer circumferential surface of the wheel 625 for movement.

In the drive device 604 or 664, as shown in FIG. 39 or 40, a driving sprocket 640, 680 is disposed within a casing 639, 679, the disk cable 602 is extended over the sprocket 640, 680, and the driving sprocket 640, 680 is driven by a driving motor 641, 681 to thereby travel the disk cable 602.

In order that the disk cable 602 is always tensed so as be traveled by the driving sprocket 640, 680 positively, a floating pulley 642, 682 is disposed in the casing 639, 679, the disk cable 602 is also extended over the floating pulley 642, 682 and the floating pulley 642, 682 is always tensed by a tension spring 643, 683 through a support member 644, 684 to constitute a disk cable tension applying mechanism 651, 691 for applying tension to the disk cable 602.

On the other hand, there is known a feed carrying apparatus wherein in order to resist against a great carrying resisting force at the corners 703*a*, as shown in FIG. 42, corner joints 708 comprising bent pipes having a relatively large radius of curvature are disposed at the corners 703*a*, and a plurality of drive devices 704 having a relatively small horse power are disposed directly before each of the corners 703*a*.

The drive device 704 is designed so that as shown in FIG. 43, a drive pulley 720 and a driven pulley 721 are disposed in a casing 719, a disk cable 602 is extended over the drive pulley 720, and the drive pulley 720 is driven by a drive motor to thereby travel the disk cable 602.

In order that the disk cable 602 is not loosened but always tensed so as be traveled by the drive pulley 720 positively, a floating pulley 722 is disposed in the casing 719, the disk cable 602 is also extended over the floating pulley 722, and the floating pulley 722 is always raised by a compression spring 723 to constitute a disk cable tension applying mechanism 731 for suitably adjusting tension of the disk cable 602.

However, in the disk cable system in which the corner joint 608 having the wheel 625 housed therein is disposed, since an angle of an external angle of the bent pipe part 624 is formed to be substantially right angles (θ=90°), when the pipeline 603 is repetitively bent vertically or horizontally or when obstacles D, D are present halfway of the pipeline channel, as shown in FIG. 44, the pipeline 603 is complicatedly bent and the pipeline channel is also lengthened, because of which the load applied to the wire 602*a* of the disk cable 602 becomes so great as to possibly break the wire in a short period of time.

Further, even the corner joint 608 having the wheel 625 housed therein, feed S breaks in the wheel receiving part 623, and so, the wheel 625 may not be rotated smoothly so much, which also results in that the load applied to the wire 602*a* becomes excessively great.

In the system wherein the corner joint 608 having the wheel housed therein is disposed at the corner 603*a*, and the disk cable tension applying mechanism 651, 691 for pulling the floating pulley 642, 682 by the tension spring 643, 683 is constituted, where the length of the disk cable 602 becomes elongated due to the use for a long period so that the elongation exceeds a fixed length, the disk cable 602 is loosened so that the tension spring 643, 683 becomes contracted, failing to apply fixed tension to the disk cable 602.

If this condition is left, the disk cable 602 cannot be traveled positively by the drive sprocket 640, 680 or, in the worst case, the disk cable 602 is disengaged from the drive sprocket 640, 680, causing the disk cable 602 not to travel at all. It has been therefore necessary, after use for a long period, to separate the pipeline 603 once, and cut the disk cable 602 to a suitable length so as to be able to apply fixed tension.

Further, as shown in FIG. 39 or 40, since the floating pulley 642, 682 is cantilevered by a support member 644, 684 and a support shaft 642*a*, 682*a* it is sometimes that the support shaft 642a, 682a of the floating pulley 642, 682 is apt to be slightly displaced, and after the use for a long period, the floating pulley 642, 682 cannot be pulled positively, or the floating pulley 642, 682 cannot be rotated smoothly.

In the conventional driving device 604, since the elastic force of the tension spring 643 is changed in direction by two pulleys 646, 646 through the wire 645 to transmit it to the floating pulley 642, it is sometimes that the elastic force is materially lowered by the resisting force at the contact part with the two pulleys 646, 646, or the pulleys 646, 646 are not rotated due to the use for a long period, failing to apply the elastic force.

In the conventional driving device 664, in order to avoid that the disk cable 602 moving in a direction of y is superposed between the drive sprocket 680 and the floating pulley 682 as shown in FIG. 40(A), the drive sprocket 680 is inclined at a fixed angle as shown in FIG. 40(B). Because of this, where high tension is always applied to the disk cable 602, there is the possibility that the disk cable 602 is disengaged from the drive sprocket 680.

Further, when the disk cable 602 becomes elongated due to the use for a long period to weaken tension, even in usual time, when the disk cable 602 is greatly vibrated, it is sometimes that the disk cable 602 is disengaged from the drive sprocket 680. Further, it is sometimes that by some reason, high load is applied to the disk cable 602 as shown in FIG. 41(A), or the disk cable 602 become broken as shown in FIG. 41(B).

So, for the purpose of detecting the disengagement of the disk cable 602, the application of high load or the breakage, an operating lever 686 is locked to the support member 684, and limit switches 687 and 688 are arranged at a suitable position of the casing 679 to make monitoring all the time. Then, where the disk cable 602 is disengaged, high load is applied, or breakage occurs, an operator immediately makes re-mounting or re-adjustment. However, since the disk cable 602 is extended over the drive sprocket 680 and the floating pulley 682, the mounting and adjusting work was extremely troublesome.

Further, in the conventional driving device 604, 664, disposition is necessary, in terms of mechanism, at a position where feed S is rarely present in the pipeline 603, that is, at a position directly before the feed hopper 605 where feed S has been supplied to all the feed units 607. However, the carrying of feed S cannot be made as theory. When feed S returned from the pipeline 603 is gradually accumulated in the driving device 604, 664 and moves into the coil part of the tension spring 643, 683 and the shafts of the drive sprocket 640, 680 and the floating pulley 642, 682, these operations are caused to be obstructed.

The feed hopper 605 becomes so large in size as to be disposed externally of a pigsty or a henhouse, and the driving device 604, 664 is naturally disposed outdoors. So, water-proof processing need be done so as to prevent rain water from entry, and the casing 639, 679 was made of stainless or covered with a sheet cover, but complete water-proof cannot be achieved, and rain water or the like moves into the driving device 604, 664 so that the drive sprocket 640, 680 and the floating pulley 642, 682 become rusty, and the feed S becomes addled.

Further, in the conventional driving device 604, 664, only one device can be disposed at a position directly before the feed hopper 605, and the length of the disk cable 602 driven is limited to about 200 m, in terms of mechanism. So, it is necessary for carrying feed S to a distant place to provide a further feed carrying apparatus.

On the other hand, in the conventional corner joint 608, the disk 602b of the disk cable 602 moving in a direction of z comes in contact with the outer circumferential surface of the wheel 625 and moves while rotating the wheel 625 to, Thereby relieve the carrying resisting force at the corner 603a. However, when feed S enters the narrow wheel receiving part 623 and becomes compressed, and the frictional resisting force caused by feed S increases, the wheel 95 cannot be rotated smoothly.

As described above, the conventional corner joint 608 is not able to relieve the carrying resisting force in the corner 603a so much, and when the pipeline 603 becomes long and the corner 603a increases, load applied to the disk cable 602 becomes excessively high so as to be possibly broken in a short period of time. From a viewpoint of this, the pipeline 603 cannot be lengthened so much, and when the disk cable 602 is broken, an operator has to make remounting immediately, being extremely troublesome.

On the other hand, in the arrangement wherein the driving device 704 is disposed directly before the corner 703a, the circumferential surface of the disk 602b of the disk cable 602 and the inner surface of the bent pipe joint 708 come in contact in a large area within the corner joint 708 comprising a bend pipe, as shown in FIG. 45, and come in contact with the feed S also in a large area whereby the frictional force becomes extremely great, and the load applied to the wire 602b becomes excessively high.

Further, in the arrangement wherein the driving device 704 is disposed directly before the corner 703a, the cost of apparatus is high, and in addition, since the disk cable 602 is driven by a plurality of driving device 704, a severe fine vibration occurs in the wire 602a in both length and diametrical directions, resulting in application of unnecessary load to the wire 602a, and resulting in greater noises.

In the arrangement wherein a plurality of driving devices 704 having a relatively small horse power are disposed directly before the corners 703a, and the disk cable tension applying mechanism 731 for raising the floating pulley 722 by the compression spring 723 is constituted, even if the length of the disk cable 602 is elongated due to the use for a long period, the pressing force of the compression spring 723 is adjusted by the plurality of disk cable tension applying mechanisms 731 to thereby apply fixed tension to the disk cable 602.

However, since the plurality of driving devices 704 having the disk cable tension applying mechanisms 731 housed therein are disposed, the cost of the feed carrying apparatus 701 is extremely high. Further, since the disk cable 602 is driven by the plurality of driving devices 704, a severe fine vibration occurs in the disk cable 602 in both length and diametrical directions, resulting in greater noises. Furthermore, since tension is adjusted by the plurality of disk cable tension applying mechanisms 731, the tension adjusting work requires a great deal of labor and time.

As shown in FIG. 43, since the contact angle between the drive pulley 720, the driven pulley 721 and the disk cable 602 is relatively small, the disk cable 602 is apt to be disengaged particularly in the driven pulley 721 on the loosened side so that the situation that the driving force of the drive motor is not transmitted occurs. Therefore, a switch for detecting the loosening of the drive pulley 720 and the driven pulley 721 is arranged, when the loosening is detected, the drive motor is stopped. It becomes necessary to effect the work for extending the disk cable 602 over the drive pulley 720 and the driven pulley 721.

In the centerless auger system also, at the corner 503a where the pipeline 503 is bent vertically or horizontally, the carrying resistance is great. However, in terms of constitution of the centerless auger 502 comprising the coils 502a, even the corner joint 608 having the wheel 625 housed therein is disposed at the corner 503a, or even the corner joint 708 comprising a bent pipe having a relatively large radius of curvature is disposed at the corner 503a, or even the drive device 704 having a relatively small horse power is disposed immediately before the corner 703a, the effect of reducing the carrying resistance can be rarely expected.

Accordingly, an attempt has been made so that the bent angle of the pipeline 503 at the corner 503a is made to be considerably smaller than the right angles (θ=90°) so as to reduce the carrying resistance at the corner 503a to some extent. As a result, the ability capable of carrying feed S is low, and in addition, the pipeline channel is unavoidably linear to fail to carry feed S efficiently.

SUMMARY OF THE INVENTION

The present invention has been accomplished in order to solve problems as seen in the above-described conventional feed carrying apparatuses, and has an object to provide a feed carrying apparatus in which by reducing the carrying resistance at a corner of a pipeline, loads applied to a wire of a disk cable, and coils of a centerless auger are reduced, the cost of apparatus is lowered, and feed can be carried smoothly and efficiently without occurrence of great noises.

For achieving the above object, a feed carrying apparatus of the present invention is characterized in that a corner joint formed with a plurality of projections which project inwardly is disposed on a bent pipe part.

It is a further object of the present invention to provide a feed carrying apparatus in which even where the length of a disk cable is elongated due to the use for a long period, fixed tension can be applied to the disk cable always without cutting the disk cable in length or without requiring a great deal of labor and time for tension adjusting work, and the disk cable can be traveled by a drive sprocket positively.

It is another object of the present invention to provide a feed carrying apparatus which is not high in cost, free from noises caused by a fine vibration of the disk cable, and which requires no special detection mechanism.

For achieving the above object, the feed carrying apparatus of the present invention is characterized in that a tension applying mechanism is disposed in which a load corresponding to weight of a weight is loaded whereby fixed tension is always applied to the disk cable.

It is another object of the present invention to provide a feed carrying apparatus wherein in a drive device, even if strong tension is not always applied to the disk cable, the disk cable is not disengaged from a drive sprocket easily whereby means for detecting that the disk cable is disengaged is not particularly necessary, and water-proof processing with respect to rain water need not be applied, and feed S can be carried to a distant place; and in a corner joint, the carrying resisting force at the corner can be considerably reduced, and even pipeline is lengthened and corners are increased, load is not applied to the disk cable so much whereby the disk cable is not possibly broken in a short period, and the cost of the whole apparatus can be considerably reduced.

For achieving the above object, the feed carrying apparatus of the present invention is characterized in that a drive device having a drive motor connected to a corner joint is arranged at a corner of the pipeline to drive a drive sprocket constituting a corner joint to move the disk cable.

It is still another object of the present invention to provide a feed carrying apparatus wherein in a drive device, where strong tension is not always applied to the disk cable, the disk cable is not disengaged from a drive sprocket easily, even if, where the disk cable is disengaged, high load is applied, and breakage occurs, re-mounting and re-adjustment can be made easily, feed S returned is gradually accumulated in the drive device, operation of the drive sprocket or the like is not obstructed, water-proof measures with respect to rain water or the like need not be applied, and feed S can be carried to a distant place; and in a corner joint, the carrying resisting force at the corner can be considerably reduced, and even pipeline is lengthened and corners are increased, load is not applied to the disk cable so much whereby the disk cable is not possibly broken in a short period, and the cost of the whole apparatus can be considerably reduced.

For achieving the above object, the feed carrying apparatus of the present invention is characterized in that a drive device is disposed at the corner of the pipeline, the drive device having a casing being formed with a cable inlet on the upper end of the side wall part and a cable outlet on the bottom wall part, and being formed with an incline wall, and having a drive sprocket arranged separately from the inclined wall within the casing.

BRIEF DESCRIPTION OF THE DRAWINGS

FIG. 1 is a perspective view of the entirety of one embodiment of a feed carrying apparatus according to the present invention.

FIG. 2 is a front view of a part of a disk cable.

FIGS. 3A, 3B are front views of embodiments of a corner joint used in the feed carrying apparatus shown in FIG. 1.

FIG. 4 is a sectional view showing the state that feed are transported along the corner joint portion shown in FIG. 3.

FIG. 13 is a perspective view of the entirety of another embodiment of a feed carrying apparatus according to the present invention.

FIG. 14 is a perspective view of the entirety of another embodiment of a feed carrying apparatus of the present invention.

FIG. 15(A) is a partly cut front view and FIG. 15(B) is a side sectional view, respectively, of a drive device used in the feed carrying apparatus of FIG. 14.

FIG. 20 is a perspective view of the entirety of a further embodiment of a feed carrying apparatus of the present invention.

FIG. 22 is an enlarged view of a main part in the vicinity of a shaft coupling of FIG. 21.

FIG. 31 is an enlarged view of a main part showing the tooth-form of a drive sprocket of FIG. 30.

FIG. 39(A) is a partly cutaway front view and FIG. 39(B) is a side sectional view, respectively, of a drive device used in the feed carrying apparatus of FIG. 36.

FIG. 40(A) is a front sectional view and FIG. 40(B) is a side sectional view, respectively, of a drive device used in the feed carrying apparatus of FIG. 36.

DETAILED DESCRIPTION OF THE INVENTION

Figure 5:
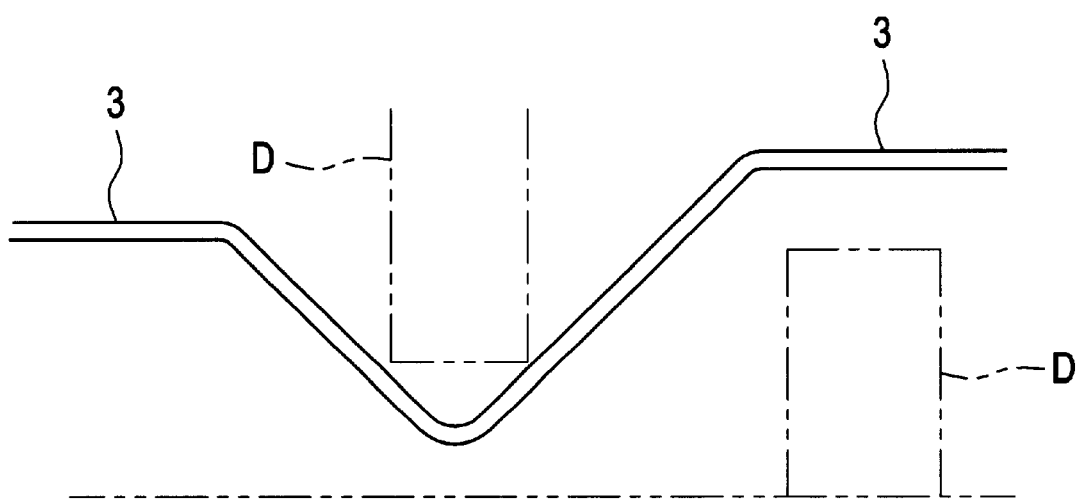
FIG. 5 is an explanatory view showing one example of a pipeline channel of the feed carrying apparatus shown in FIG. 1.

The preferred embodiments of the feed carrying apparatus according to the present invention will be described in detail hereinafter with reference to the drawings.

FIG. 1 is a perspective view of the entirety of one embodiment of a feed carrying apparatus according to a disk cable system of the present invention; FIG. 2 is a front view of a part of a disk cable; FIG. 3 is a front view of one embodiment of a corner joint used in the feed carrying apparatus shown in FIG. 1; FIG. 4 is a sectional view showing the state that feed are transported along the corner joint portion shown in FIG. 3.

In the feed carrying apparatus 1 according to the present invention, a number of feeding units 7, 7, . . . are disposed through feed falling-down pipes 6, 6, . . . held in a fixed spaced relation on a pipeline 3 connected endlesswise, and a driving device 4 for forcibly feeding in a direction of arrow x a disk cable 2 inserted into the pipeline 3 and connected endlesswise is disposed as shown FIG. 1.

Further, a feed charging port 5a is formed at the lower end of a feed hopper 5 indicated by the phantom line, in the figure, feed falling-downports 6a are formed at the lower end of the feed falling-down pipes 6, so that feed S is charged into the pipeline 3 from the feed charging port 5a and carried in the pipeline 3, and then supplied into the feeding units 7 from the feed falling-down ports 6a.

In the disk cable 2, as shown in FIG. 2, the disks 2b are secured to a flexible wire 2a in a fixed spaced relations.

At corners 3a of the pipeline 3 are disposed corner joints 8 in which bent pipe forming members 9, 10 are placed in contact and secured by collars 9a, 10a, as shown in FIGS. 1, 3 and 4.

FIG. 3(A) is a corner joint 8 in which an external angle ($\theta$) of a bent pipe part 11 is 90°, and (B) is a corner joint 28 in which an external angle ($\theta$) of a bent pipe part 31 is 45°, either of which a plurality of projections 12, 32 which project inwardly are provided at the bent pipe parts 11, 31.

According to the feed carrying apparatus 1 of the present invention, since a driving device is not disposed immediately before each corer, and a corner joint having a wheel housed therein is neither disposed, the cost of apparatus is materially lowered.

According to the corner joints 8, 28, as shown in FIG. 4, a circumferential surface of a disk 2b comes in contact with the plurality of projections 12, 32, being close to the state of point-contacts at a few parts, so that the contact area between the circumferential surface of the disk 2b and the internal surfaces of the bent pipe parts 11, 31, and the contact area with feed S is also small, thus being possible to make the frictional force small, and to considerably reduce the load applied to a wire 2a.

Further, since the behavior of the disk 2b can be controlled by the projections 12, 32, micro-vibrations of the wire 2a both in a longitudinal direction and a diametrical direction can be reduced, thus not applying an extra load to the wire 2a and rarely producing noises.

Further, as shown in FIG. 3, if corner joints having an external angle ($\theta$) such as the corner joint 8 in which an external angle ($\theta$) of a bent pipe part 11 is 90°, and the corner joint 28 in which an external angle ($\theta$) of a bent pipe part 31 is 45° are prefabricated, the corner joints which are different in external angle (θ) can be suitably used whereby the pipeline channel can be inclined; and as shown in FIG. 5, since obstacles D, D can be avoided, the pipeline channel can be made simple and short, and the load applied to the wire 2a is further reduced.

Figure 6:
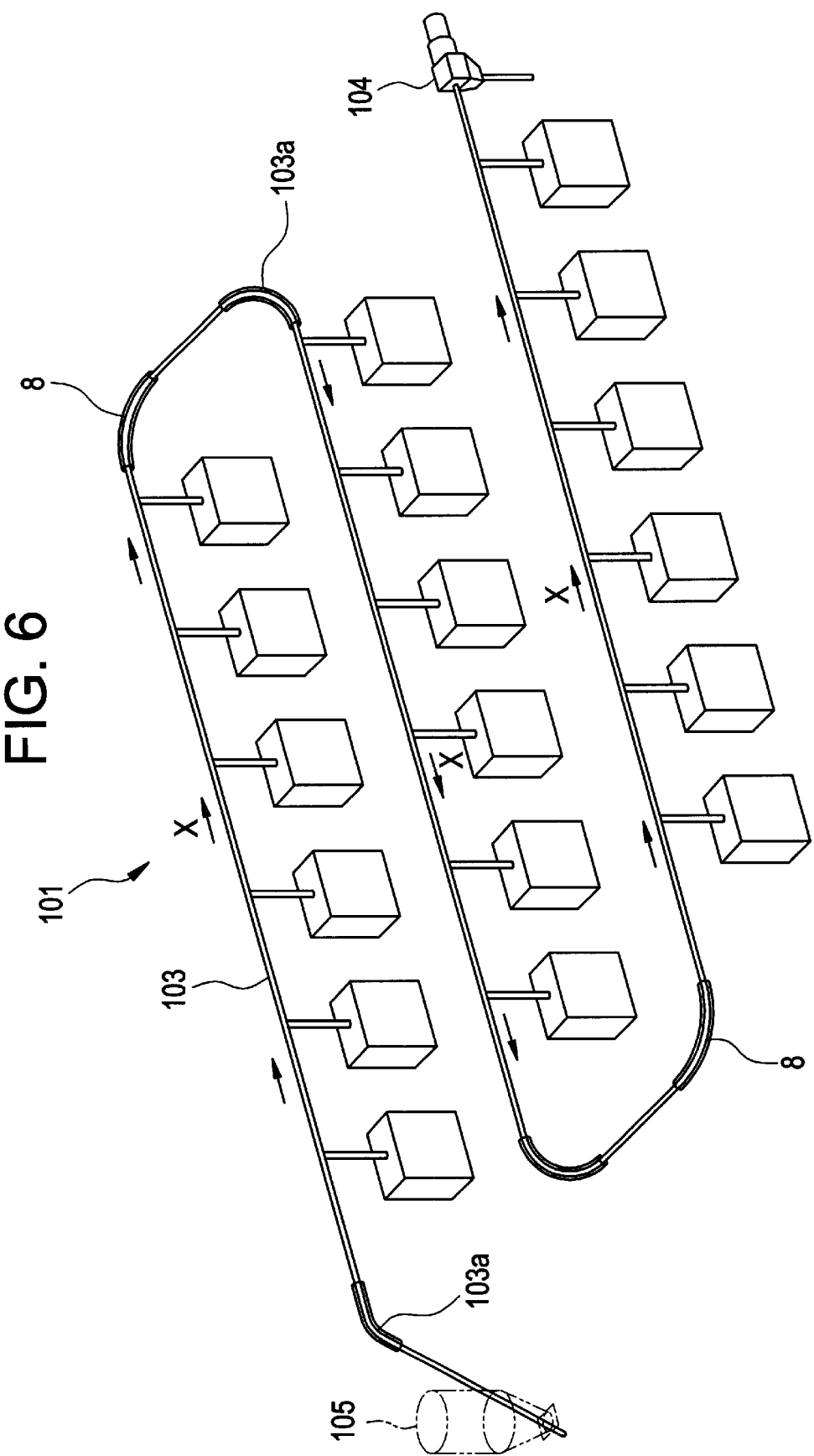
FIG. 6 is a perspective view of the entirety of a further embodiment of a feed carrying apparatus according to the present invention.

FIG. 6 is a perspective view of the entirety of one embodiment of a feed carrying apparatus according to a centerless auger system of the present invention. Also in a corner 103a of a pipeline 103 of a feed carrying apparatus 101 shown in FIG. 6, corner joints 8, 28 are disposed in which bent pipe forming members 9, 10 as shown in FIGS. 3 and 4 are placed in contact and secured by collars 9a, 10a.

According to the corner joints 8, 28, the circumferential surface of coil 502a comes in contact with a plurality of projections 12, 32, being close to the state of point-contacts at a few parts, whereby the contact area between the circumferential surface of the coil 502a and the internal surface of the bent pipe parts 11, 31 is small, the contact area with feed S is also small to enable reducing the frictional force, and the load applied to the coil 502a can be considerably reduced.

Thereby, the bent angle of the pipeline 103 at the corner 103a can be made substantially right angles (θ=90°), whereby the ability capable of carrying feed S is considerably enhanced, and the pipeline channel can be also suitably bent to make it possible to carry feed S efficiently.

Figure 7:
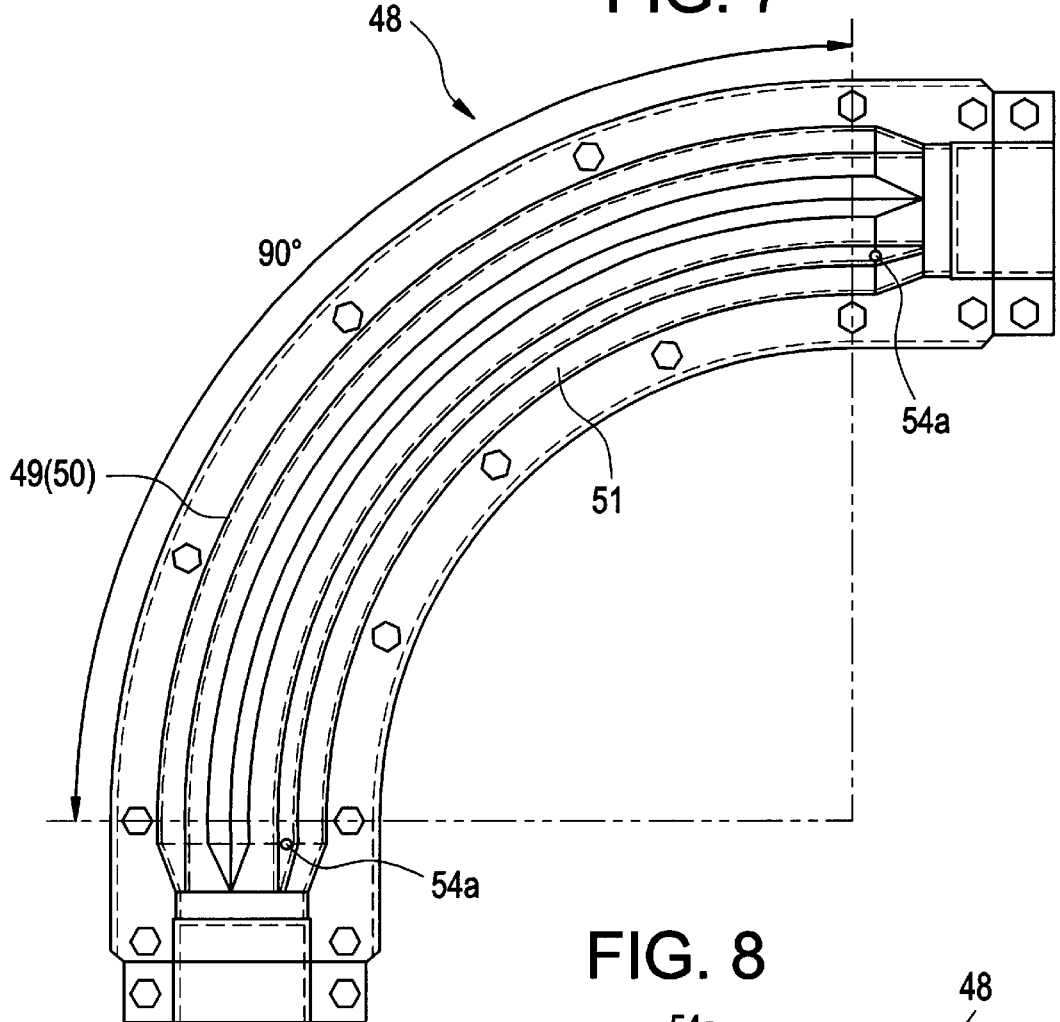
FIG. 7 is a front view of a further embodiment of a corner joint used in the feed carrying apparatus shown in FIG. 1.
Figure 8:
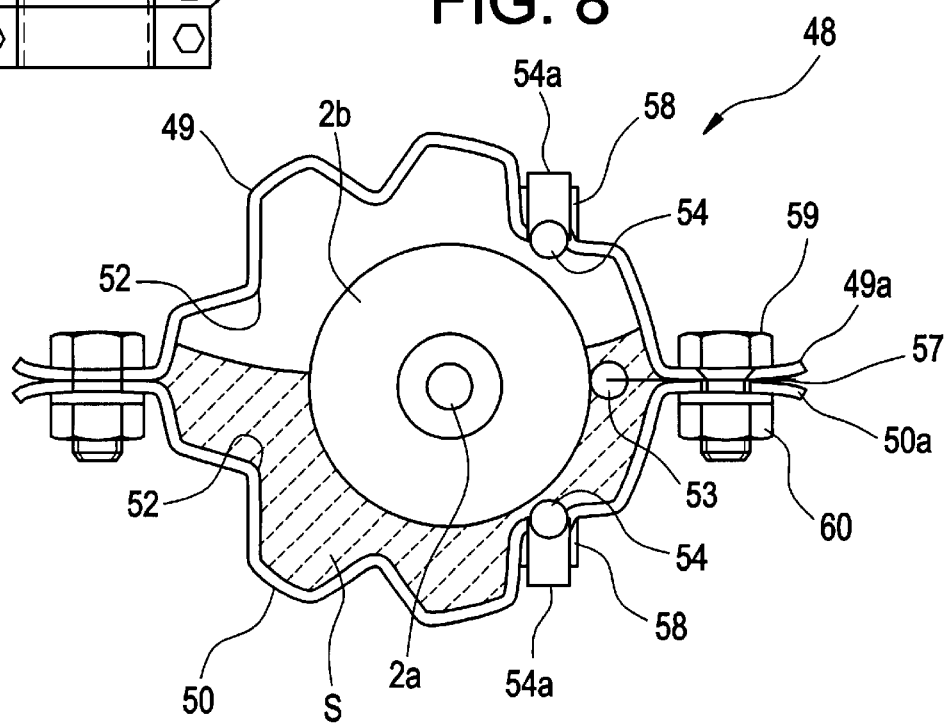
FIG. 8 is a sectional view showing the state that feed are transported along the corner joint portion shown in FIG. 7.

FIG. 7 is a front view of a further embodiment of a corner joint, and FIG. 8 is a sectional view showing the state that feed are transported along the corner joint portion shown in FIG. 7.

A corner joint 48 comprises bent pipe forming members 49, 50, and contact members 53, 54, etc., as shown in FIGS. 7 and 8.

Collars 49a, 50a of the bent pipe forming members 49, 50 are bored with bolt inserting holes 55. A bent pipe part 51 is formed with a plurality of projections 52 which project inwardly, both ends of which are bored with contact member mounting holes 56.

Figure 9:
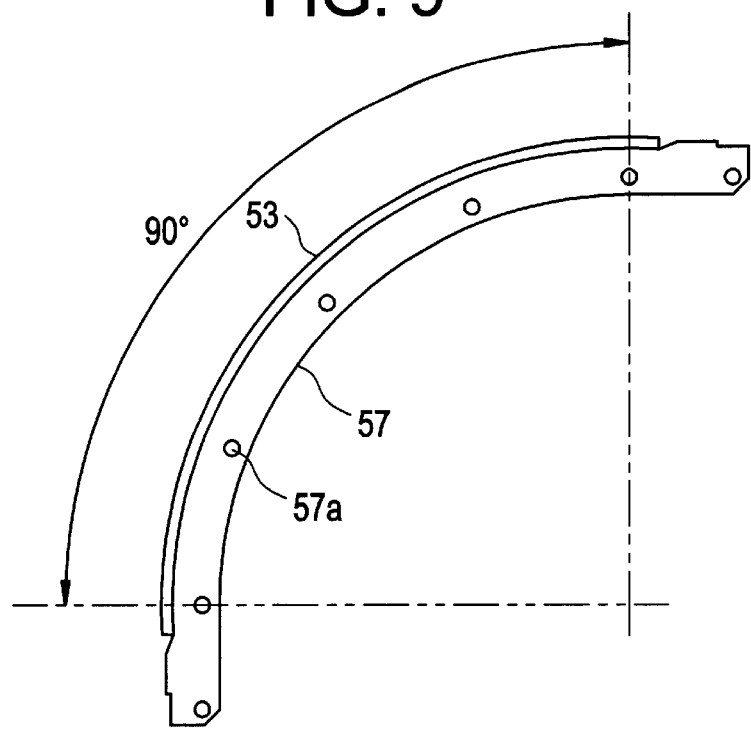
FIG. 9 is a front view of a contact member secured to a support member.

The contact member 53 is a rod having a circular cross section curved with the radius of curvature corresponding to the bent pipe part 51, the rod being secured by welding or the like to the outer circumference of a plate-like support member 57 formed into a shape corresponding to the internal collars 49a, 50a, as shown in FIGS. 8 and 9.

Figure 10:
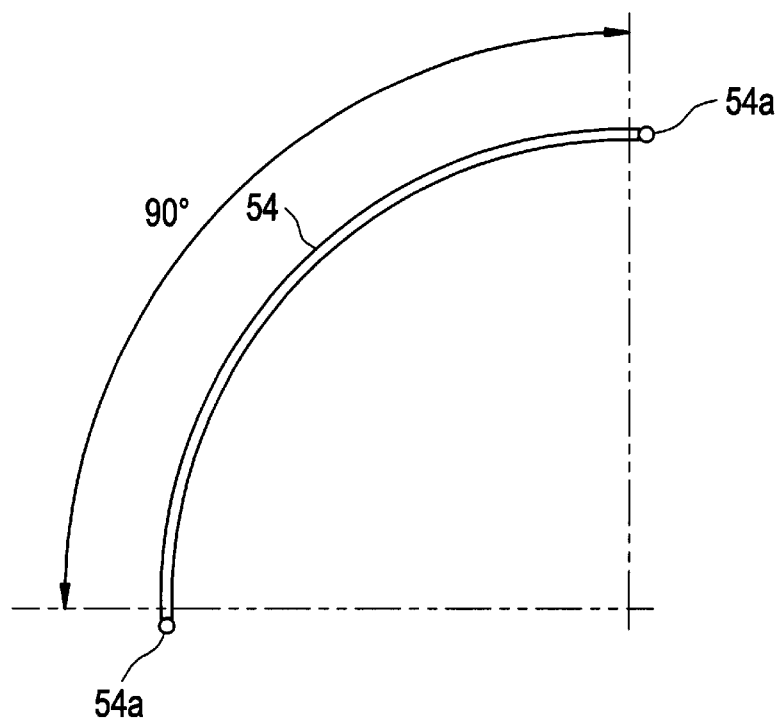
FIG. 10 is a front view of a contact member.

The contact member 54 is a rod having a circular cross section curved with the radius of curvature corresponding to the bent pipe part 51, both ends of which are bent substantially at right angles, as shown in FIGS. 8 and 10.

Figure 11:
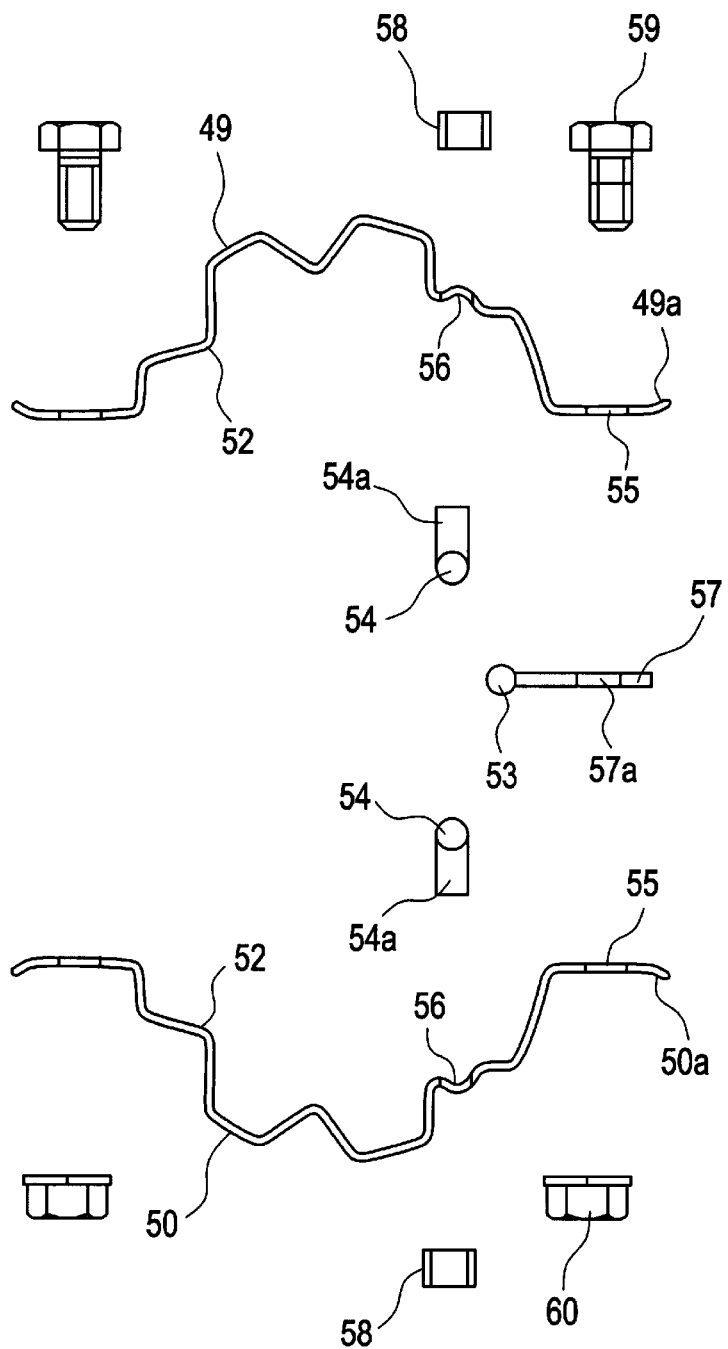
FIG. 11 is a front view showing a process for the assembly of the corner joint shown in FIG. 7.

The corner joint 48 is constituted by first the bent parts 54a, 54a of the contact members 54, 54 into the contact member mounting holes 56, 56 of the bent pipe forming members 49, 50, as shown in FIG. 11, and securing the contact members 54, 54 to the bent pipe forming members 49, 50 by rubber tubes 58, 58, as shown in FIG. 8.

Afterward, a support member 57 is held by the collars 49a, 50a internally of the bent pipe forming members 49, 50, and a bolt 59 is inserted into bolt inserting holes 55, 55 of the collars 49a, 50a, and a bolt inserting hole 57a of the support member 57, and the bolt is tightened by a nut 60 to thereby constitute the corner joint 48, as shown in FIG. 8.

According to the corner joint 48, as shown in FIG. 8, since the circumferential surface of the disk 2b comes in point-contact with the contact members 53, 54, the contact area between the circumferential surface of the disk 2b and the inner surface of the bent pipe part 51 is small, and the contact area with feed S is also small to make it possible to reduce the frictional force, thus considerably reducing the load applied to the wire 2a.

Figure 12:
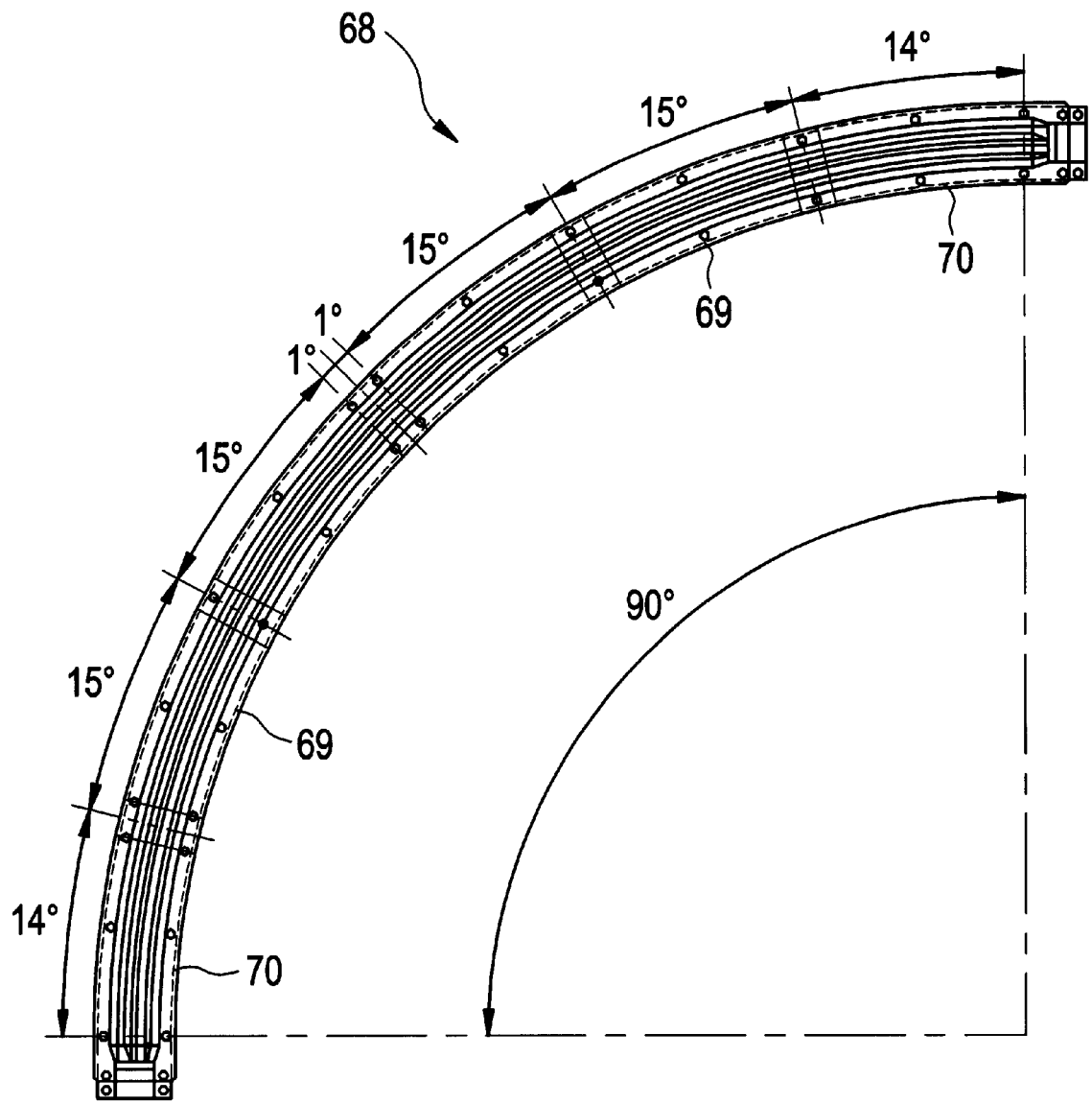
FIG. 12 is a front view of another embodiment of a corner joint used in the feed carrying apparatus shown in FIG. 1.

Further, where the contact members 53, 54 become worn due to a long period use, the rubber tubes 58, 58, the bolt 59, and the nut 60 are removed to disassemble the corner joint 48, and only the contact members 53, 54 will suffice to be exchanged. Since the corner joint 48 is not necessary to be exchanged, the running cost is lowered, and the maintenance work is simple.

Where the radius of curvature of the corner joint is large, and where the external angle θ is desired to be variously set, bent pipe forming members 69, 70 having a suitable external angle θ, for example, such as 15° may be fabricated, as shown in FIG. 12, the bent pipe forming members 69, 70 being connected in plural so as to constitute the corner joint 68.

According to the corner joint 68, corner joints different in external angle θ can be easily constituted, and the disposition of the pipeline channel and the avoidance of obstacles or the like can be facilitated.

FIG. 13 is a perspective view of the entirety of another embodiment of a feed carrying apparatus according to the centerless auger system of the present invention. A driving device 154 is disposed on one end of a pipeline 153 of a feed carrying apparatus 151, a feed charging port from a feed hopper 155 is provided in the vicinity thereof, the driving device 154 being provided on the other end also.

Also at a corner 153a of the pipeline 153 is disposed corner joints 8, 28 in which the bent pipe forming members 9, 10 as shown in FIGS. 3 and 4 are placed in contact and secured by the collars 9a, 10a.

Since in the feed carrying apparatus 151, the driving devices 154, 154 are disposed on both ends of the pipeline 153, the cost of apparatus is somewhat high, but as the carrying force caused by the centerless auger 502 increases, feed S can be carried more efficiently as compared with the feed carrying apparatus 101.

FIG. 14 is a perspective view of the entirety showing a further embodiment of a feed carrying apparatus according to a disk cable system of the present invention.

In the feed carrying apparatus 201, a number of feeding units 207, 207, . . . are disposed through feed falling-down pipes 206, 206, . . . held in a fixed spaced relation on a pipeline 203 connected endlesswise, and a drive device 204 for forcibly feeding in a direction of arrow x a disk cable 2 inserted into the pipeline 203 and connected endlesswise is disposed, similarly to the conventional feed carrying apparatus.

A corner joint 208 having a wheel housed therein is disposed at a corner 203a in which the pipeline 203 is bent substantially at right angles in the vertical or horizontal direction.

The construction of the disk cable 2, the feed hopper 205, the feed falling-down pipe 206, and the feeding unit 207 is similar to those of the feed carrying apparatus 1 of FIG. 1.

The feed carrying apparatus 201 is characterized by a disk cable tension applying mechanism 221 constituted within the drive device 204.

In the drive device 204, as shown in FIG. 15, a drive sprocket 210 is disposed within a casing 209, a disk cable 2 is extended over the drive sprocket 210, and the drive sprocket 210 is driven by a drive motor 211 to thereby cause the disk cable 2 to travel.

The disk cable tension applying mechanism 221 comprises a floating pulley 222 disposed within the casing 209, support members 223, 224 for center-supporting the floating pulley 222, guide members 225, 226 for sliding and guiding the support members 223, 224, and a weight 228 for pulling the floating pulley 222 through the support member 223 and a wire 227.

The support member 223 is that an engaging member 223b engaged with the guide member 225 is secured to the back of an L-shaped plate 223a one end of which is bent. The support member 224 is that a pawl-like engaging member 224b engaged with the guide member 226 is secured to the upper end of a suspended rectangular plate 224a. Both ends of a support shaft 222a of the floating pulley 222 are secured to the left end of the L-shaped plate 223a and the lower end of the rectangular plate 224a.

The guide members 225, 226 extend in the direction for pulling the floating pulley 222, and are secured at both ends thereof to a suitable position of the casing 209.

The weight 228 has the upper surface to which is secured one end of the wire 227, and is suspended externally of the casing 209, and the wire 227 is guided by the pulley 229 to change the direction thereof, and is inserted into the casing 209 and has the other end secured to the right end of the L-shaped plate 223a.

Thereby, the load corresponding to the weight of the weight 228 is always loaded on the floating pulley 222, and fixed tension is always urged to the disk cable 2 extended over the floating pulley 222.

Even where the length of the disk cable 2 is elongated due to the use for a long period, the support members 223, 224 are slidably moved along the guide members 225, 226, that is, the floating pulley 222 is moved, and the position of the weight 228 is merely moved down. Therefore, likewise, the load corresponding to the weight of the weight 228 is always loaded on the floating pulley 222, and fixed tension is always urged to the disk cable 2.

As described above, according to the disk cable tension applying mechanism 221, since the load is always automatically loaded on the floating pulley 222 by the weight of the weight 228, fixed tension is always urged to the disk cable 2 so that the disk cable 2 is not disengaged from the drive sprocket 210 to cause the disk cable 2 to travel. Of course, the disk cable 2 need not be cut in length.

Since the floating pulley 222 is center-supported by the support members 223, 224, the support shaft 222a of the floating pulley 222 is rarely displaced, and even after the use for a long period, the floating pulley 222 can be pulled positively, and the floating pulley 222 can be rotated smoothly.

Further, since gravity of the weight 228 is transmitted to the floating pulley 222 merely by changing the direction by a single pulley 229 through the wire 227, the load is not lowered by the resisting force in the contact part with the pulley 229 or the pulley 229 can be rotated even the use for a long period to apply the elastic force.

Figure 16:
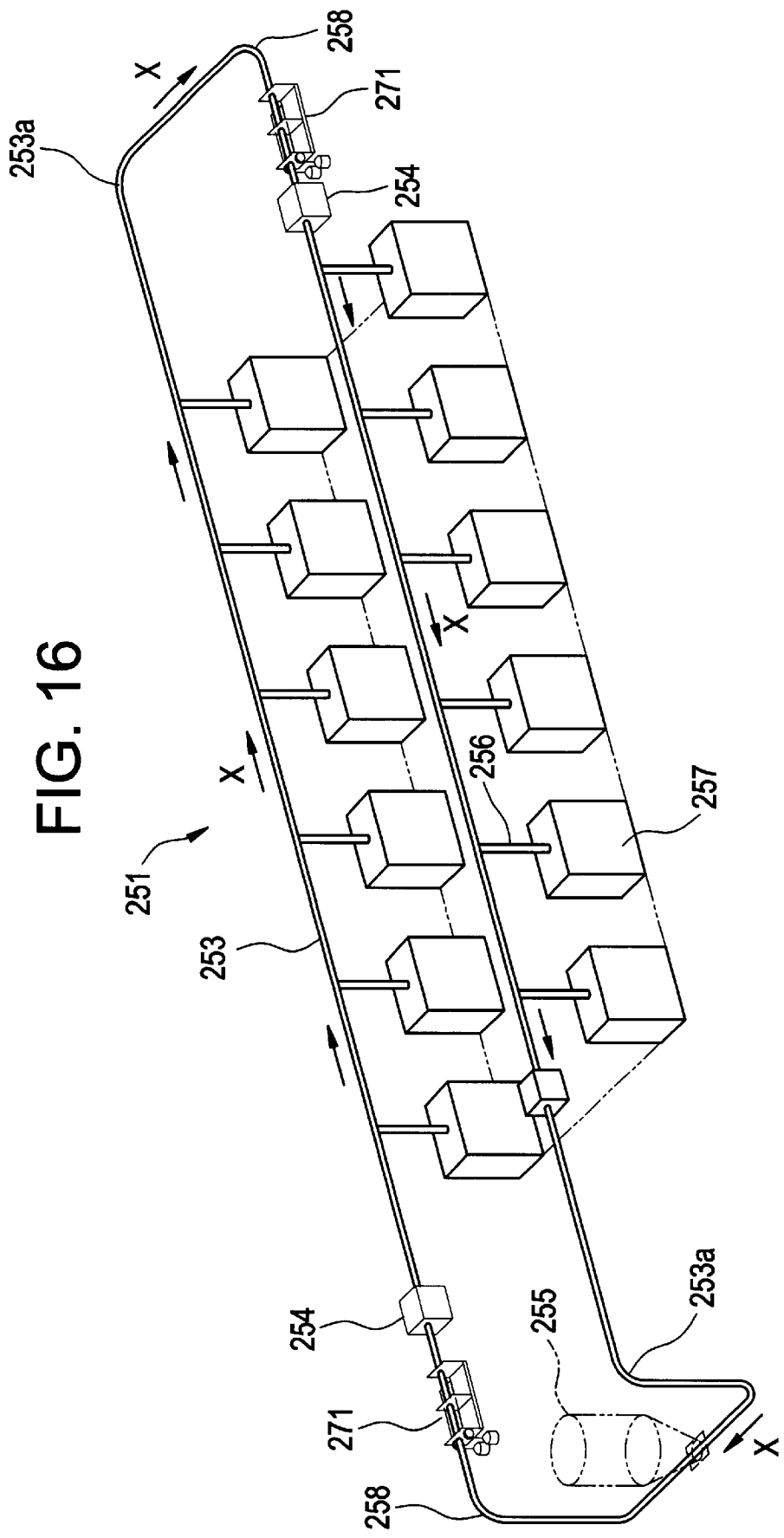
FIG. 16 is a perspective view of the entirety of another embodiment of a feed carrying apparatus according to the present invention.

FIG. 16 is a perspective view of the entirety showing another embodiment of the feed carrying apparatus according to the disk cable type of the present invention.

In the feed carrying apparatus 251, similarly to the conventional feed carrying apparatus, a corner joint 258 comprising a bent pipe having a relatively large radius of curvature is disposed at a corner 253a in which a pipeline 253 is bent substantially at right angles to the vertical or horizontal direction.

A drive device 254 having a relatively small horse power and a disk cable tension applying mechanism 271 are disposed in a straight line portion of the pipeline 253 and immediately after the corner 253a.

The construction of the disk cable 2, the feed hopper 255, the feed falling-down pipe 256, and the feeding unit 257 is similar to those of the feed carrying apparatus 1 of FIG. 1.

The feed carrying apparatus 251 is characterized by the disk cable tension applying mechanism 271 constituted separately from a drive device 254.

Figure 17:
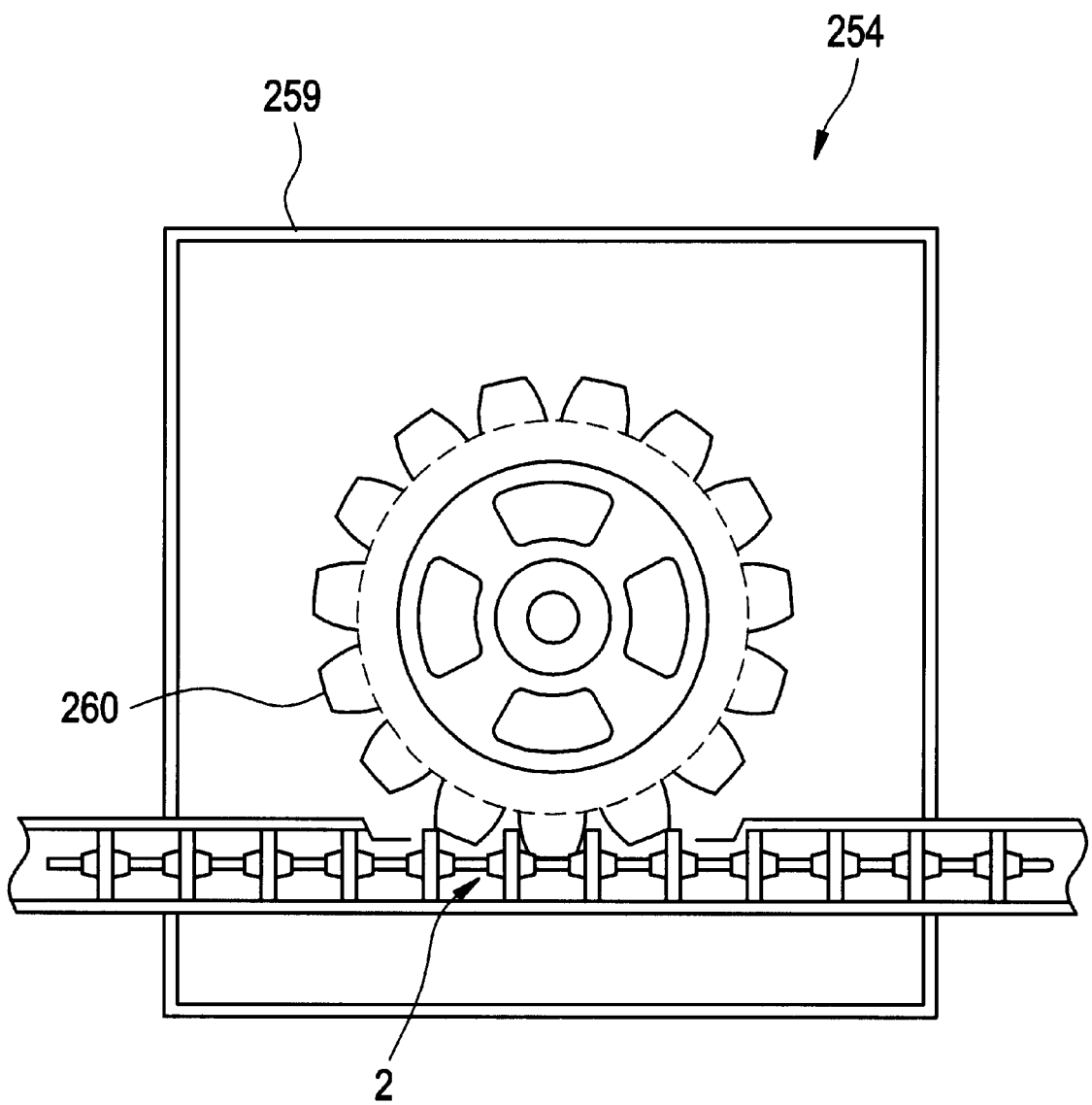
FIG. 17 is a front sectional view of a drive device used in the feed carrying apparatus of FIG. 16.

The drive device 254 is of an extremely simple construction in which, as shown in FIG. 17, a drive sprocket 260 is disposed within a casing 259, and the disk cable 2 is placed in contact with a drive sprocket 260 so that the latter is driven by a drive motor to thereby cause the disk cable 2 to travel.

Figure 18:
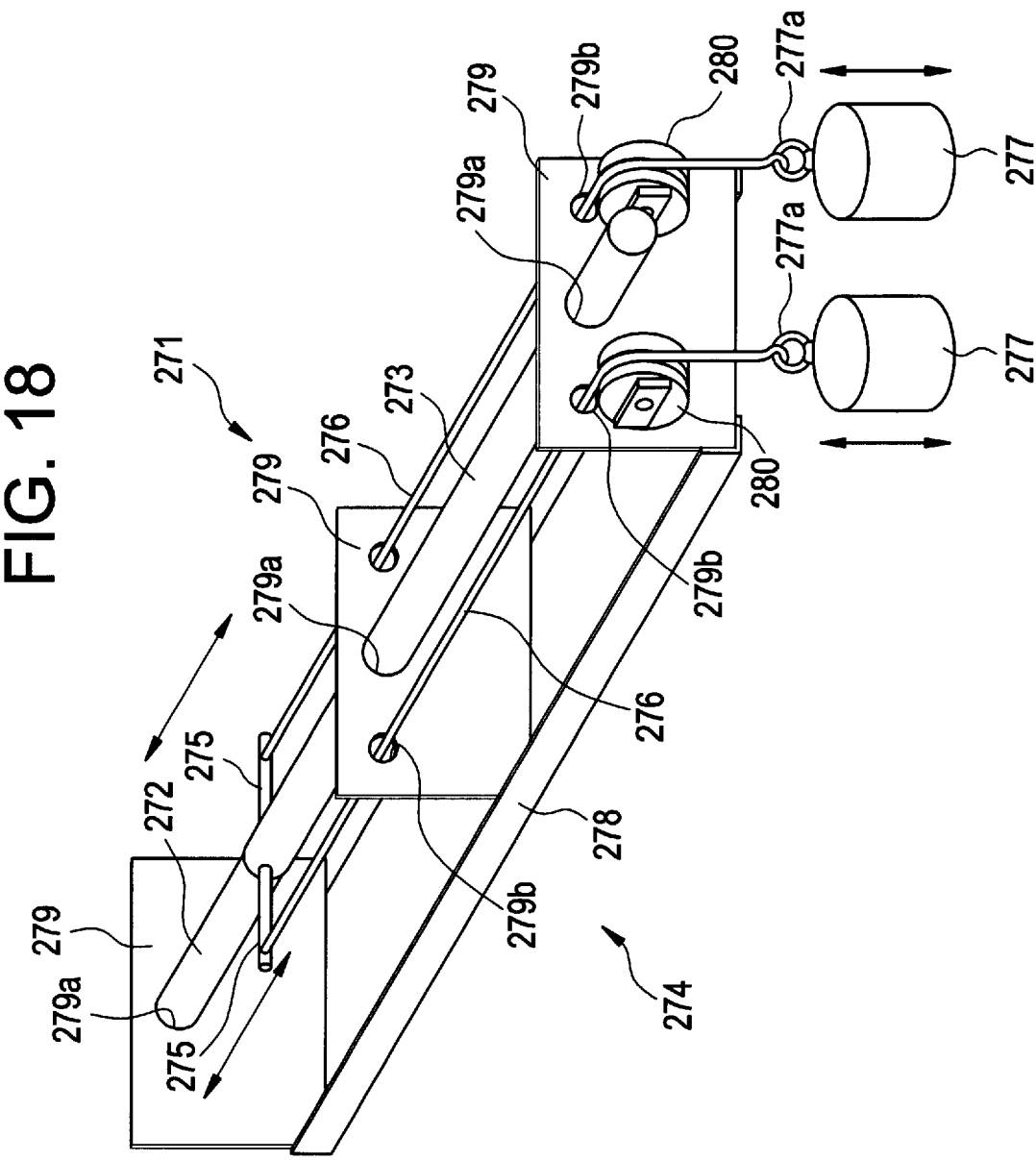
FIG. 18 is a perspective view of a disk cable tension applying mechanism used in the feed carrying apparatus of FIG. 16.
Figure 19:
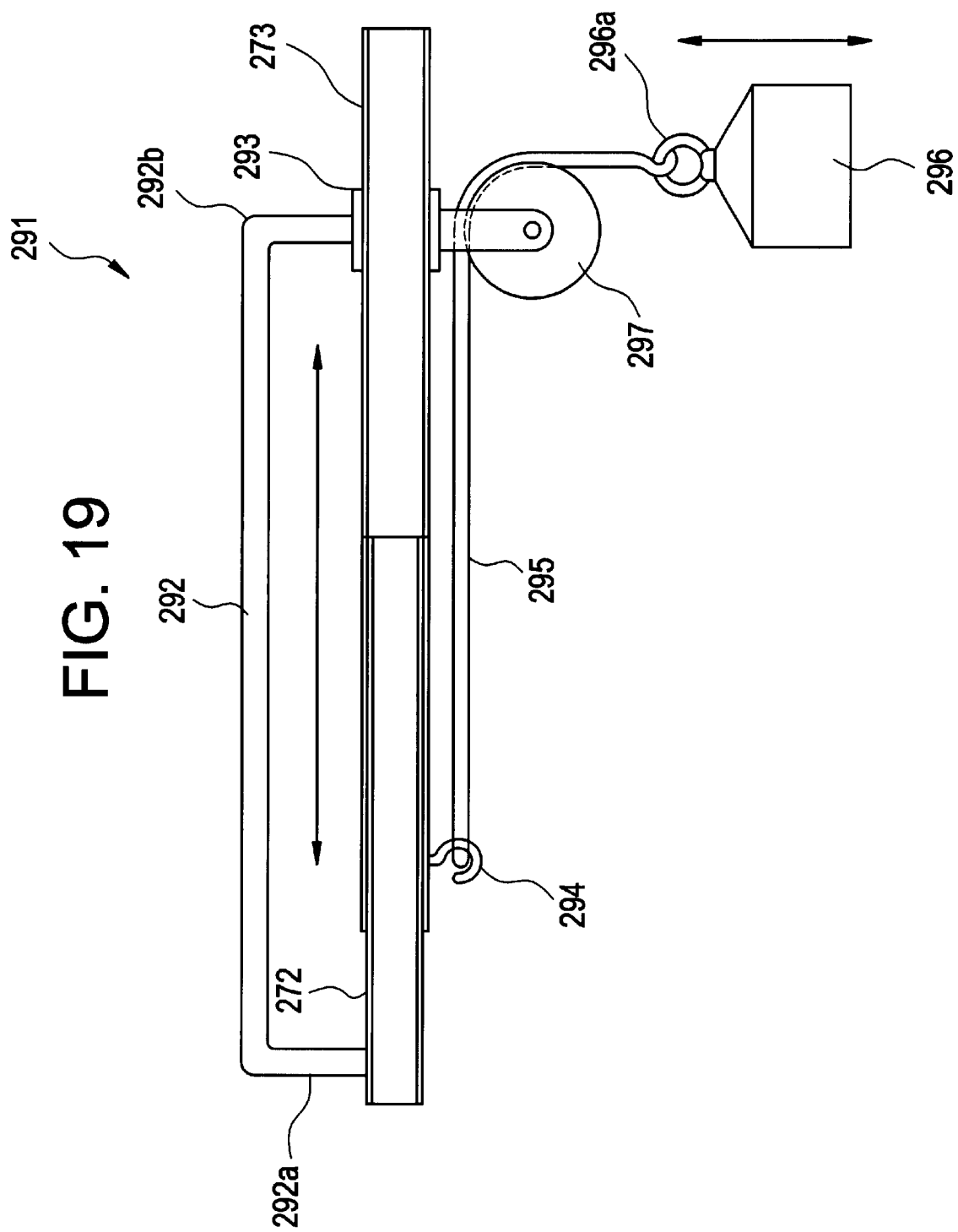
FIG. 19 is a sectional view of a disk cable tension applying mechanism used in the feed carrying apparatus in FIG. 16.

The disk cable tension applying mechanism 271 comprises, as shown in FIG. 18, an inner piping 272 and an outer piping 273 which are placed in contact in inner and outer circumferential surfaces and are slidable, a support frame 274 for supporting the inner piping 272 and the outer piping 273, a stop member 275 secured to the extreme end of the outer piping 273, and a weight 277 for pulling the outer piping 273 through the stop member 275 and a wire 276.

The support frame 274 has support plates 279, 279, 279 stood upright on a support base 278 in a suitably spaced relation. Each of the support plates 279, 279, 279 is bored with a piping fitting hole 279a, and the support plates 279, 279 close to the weight 277 is bored with a wire inserting hole 279b. A pulley 280 is rotatably supported on the support plate 279 closest to the weight 277.

The weight 277 is suspended externally of the support frame 274 with one end of the wire 276 secured to a suspension metal fitting 277a secured to the upper surface thereof. The wire 276 is guided by the pulley 280 to change the direction thereof, is inserted into the wire inserting hole 279b and has the other end secured to the stop member 275.

Thereby, the load corresponding to the weight of the weight 277 is always loaded on the outer piping 273 to always pull the pipeline 253 so as to be elongated whereby fixed tension is always relatively urged against the disk cable 2 inserted into the pipeline 253.

Even if the length of the disk cable 2 is elongated due to the use for a long period, the outer piping 273 is slidably moved along the inner piping 272 accordingly, that is, the length of the pipeline 253 is elongated, and the position of the weight 277 is merely moved down. Therefore, naturally, the load corresponding to the weight of the weight 277 is always loaded on the outer piping 273, and fixed tension is always relatively urged against the disk cable 2.

As described above, according to the disk cable tension applying mechanism 271, since the outer piping 273 is always pulled by the weight of the weight 277 so that the length of the pipeline 253 is automatically elongated, fixed tension is always relatively urged against the disk cable 2, requiring no great deal of labor and time for the tension adjusting work. Since the drive device 254 has no disk cable tension applying mechanism 271 housed therein, the cost of the feed carrying apparatus 251 is extremely low, and since the drive device 254 and disk cable tension applying mechanism 271 are disposed in the straight line portion of the pipeline 253 and immediately after the corner 253a, the fine vibrations in the length direction and the diametrical direction of the disk cable 2 are considerably reduced and the noises rarely occur.

Since the drive device 254 is of an extremely simple construction in which the disk cable 2 is merely placed in contact with the drive sprocket 260, the disk cable 2 is not disengaged due to the drive sprocket 260. Therefore, a switch for detecting the loosening of the drive sprocket 260 need not be provided.

While in the disk cable tension applying mechanism 271 shown in FIG. 18, the support frame 274 is provided, and two weights 277, 277 are provided, it is to be noted that there can be provided a disk cable tension applying mechanism 291 in which a support member 292 for supporting the inner piping 272 and the outer piping 273, and a single weight 296 for pulling the outer piping 273 through a stoop member 294 and a wire 295 are provided.

The support member 292 is one in which both ends of a rod are bent substantially at right angles, wherein one end 292a is secured to the outer circumferential surface of the inner piping 272, and the other end 292b is secured to the outer circumferential surface of a guide member 293 in the form of a pipe, and the outer circumferential surface of the outer piping 273 is brought into contact with the inner circumferential surface of the guide member 293 to make the outer piping 273 slidable.

The wire 295 is secured to a suspension metal fitting 296a having one end secured to the upper surface of the weight 296, and is guided by a pulley 297 supported rotatably on the guide member 293 to change the direction thereof, and the other end thereof is secured to the stop member 294 secured to the extreme end of the outer piping 273.

Even in the disk cable tension applying mechanism 291, the load corresponding to the weight of the weight 296 is always loaded on the outer piping 273, the pipeline 253 is always pulled so that the length is elongated, and therefore, fixed tension is always relatively urged against the disk cable 2 inserted into the pipeline 253.

Even if the length of the disk cable 2 is elongated due to the use for a long period, the outer piping 273 is slidably moved along the inner piping 272 accordingly, that is, the length of the pipeline 253 is elongated, and the position of the weight 296 is merely moved down. Therefore, naturally, the load corresponding to the weight of the weight 296 is always loaded on the outer piping 273, and fixed tension is always relatively urged against the disk cable 2.

Figure 21B:
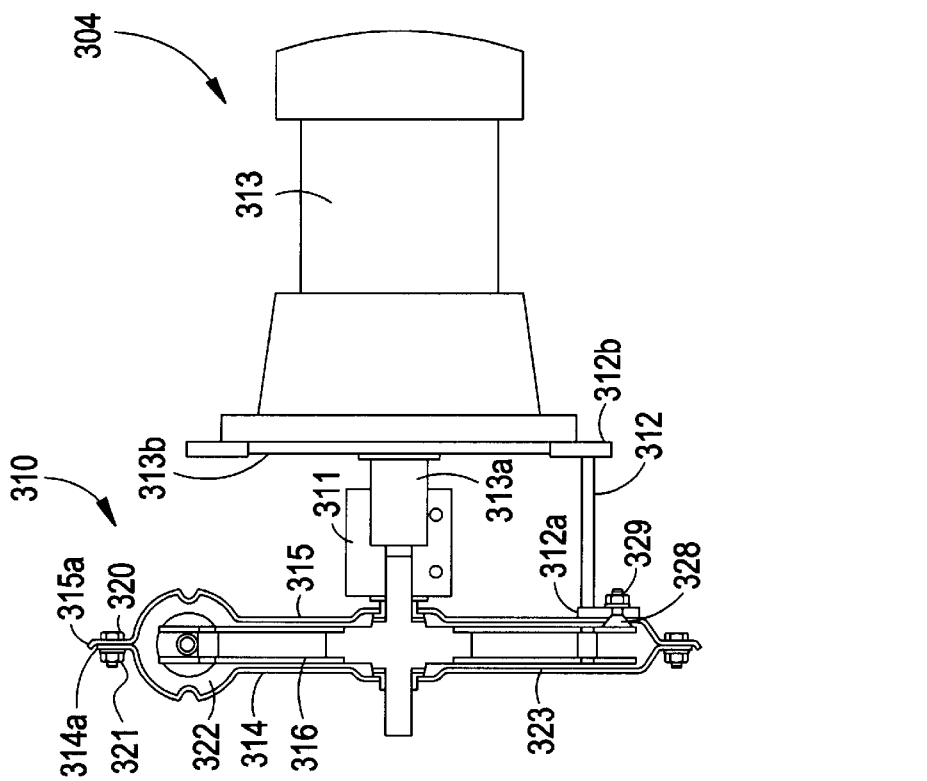
FIG. 21(A) is a front sectional view and FIG. 21(B) is a side sectional view, respectively, of a drive device used in the feed carrying apparatus of FIG. 20.
Figure 21A:
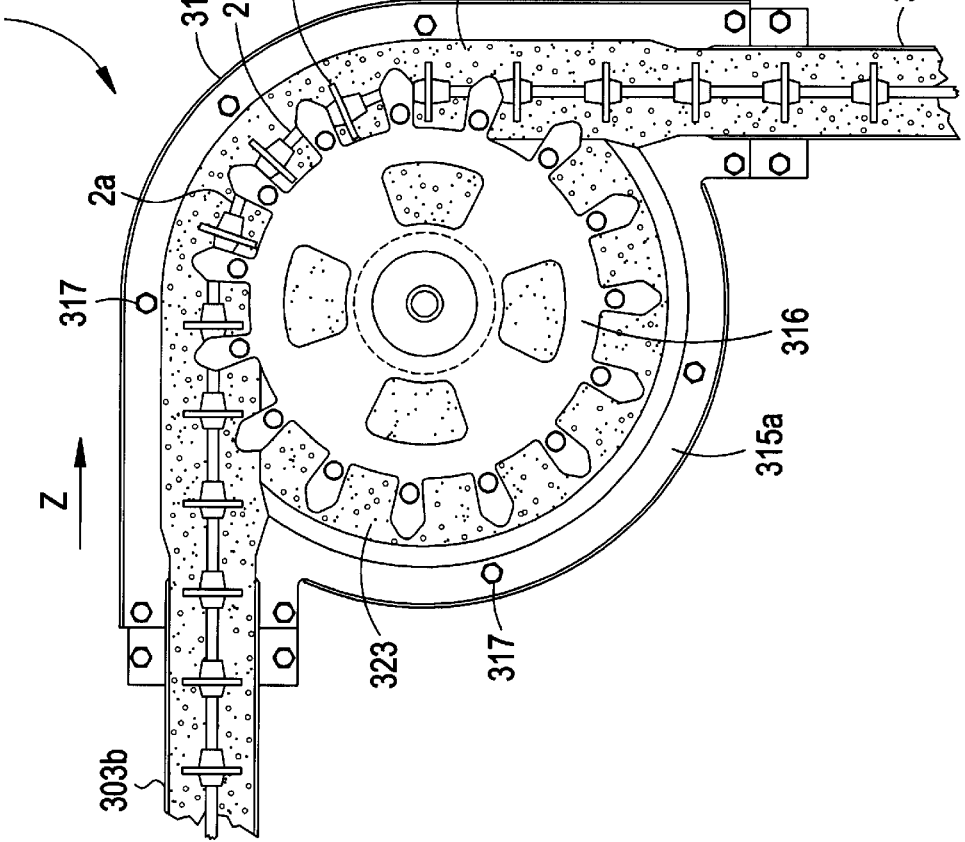
Figure 23B:
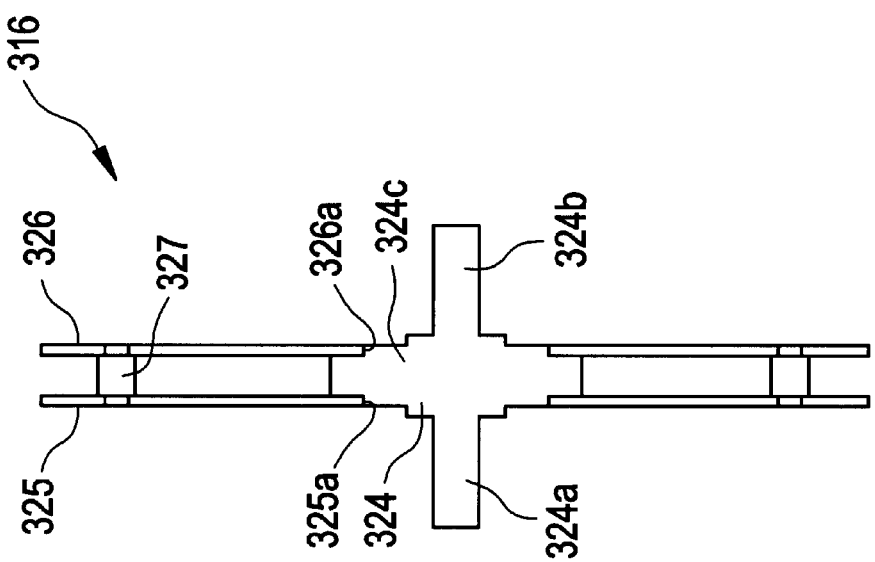
FIG. 23(A) is a front view and FIG. 23(B) is a side sectional view, respectively, of a drive sprocket housed in a corner joint of FIG. 21.

FIG. 20 is a perspective view of the entirety of a further embodiment of a feed carrying apparatus according to a disk cable type of the present invention; FIG. 21(A) is a front sectional view and FIG. 21(B) is a side sectional view, respectively, of a drive device used in the feed carrying apparatus of FIG. 20; FIG. 22 is an enlarged view of a main part in the vicinity of a shaft coupling of FIG. 21; 23(A) is a front view and FIG. 23(B) is a side sectional view, respectively, of a drive sprocket housed in a corner joint; and FIG. 24 is an enlarged view of a main part sowing the tooth form of a drive sprocket of FIG. 23.

In the feed carrying apparatus 301, a number of feeding units 307, 307, . . . are disposed through feed falling-down pipes 306, 306, . . . held in a fixed spaced relation on a pipeline 303 connected endlesswise, and a disk cable 2 having disks 2b secured to a flexible wire 2a connected endlesswise in a fixed spaced relation is inserted into the pipeline 303, similarly to the conventional feed carrying apparatus.

A drive device 304 or a corner joint 308 is disposed at a corner 303a of the pipeline 303, and a tension applying device 309 is disposed at a suitable position between the corners 303a of the pipeline 303.

The construction of the disk cable 2, the feed hopper 305, the feed falling-down pipe 306, and the feeding unit 307 is similar to those of the feed carrying apparatus 1 of FIG. 1.

In the drive device 304, a drive motor 313 is connected to a corner joint 310 through a shaft coupling 311 and a support member 312.

The corner joint 310 is comprised of covers 314, 315 and a drive sprocket 316, collars 314a, 315a of the covers 314, 315 are bored with fastening bolt holes 316, 317 for fastening the covers 314, 315 together and connecting a straight pipe 303b of the pipeline 303, and the covers 314, 315 are bored in their center with rotational shaft fitting holes 318, 319.

A sprocket housing part 323 for a bent pipe 322 for transporting the disk cable 2 and a sprocket 316 is formed by placing collars 314a, 315a of the covers 314, 315 and fastening them by bolts 320 and nuts 321.

Figure 23A:
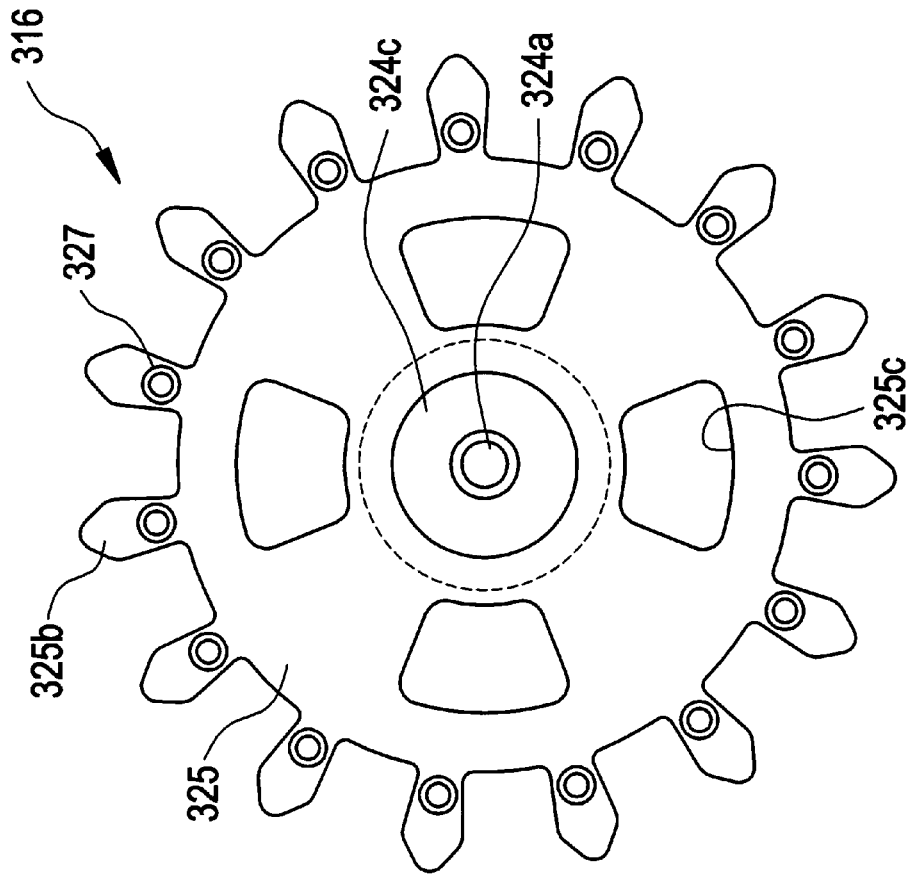
Figure 24:
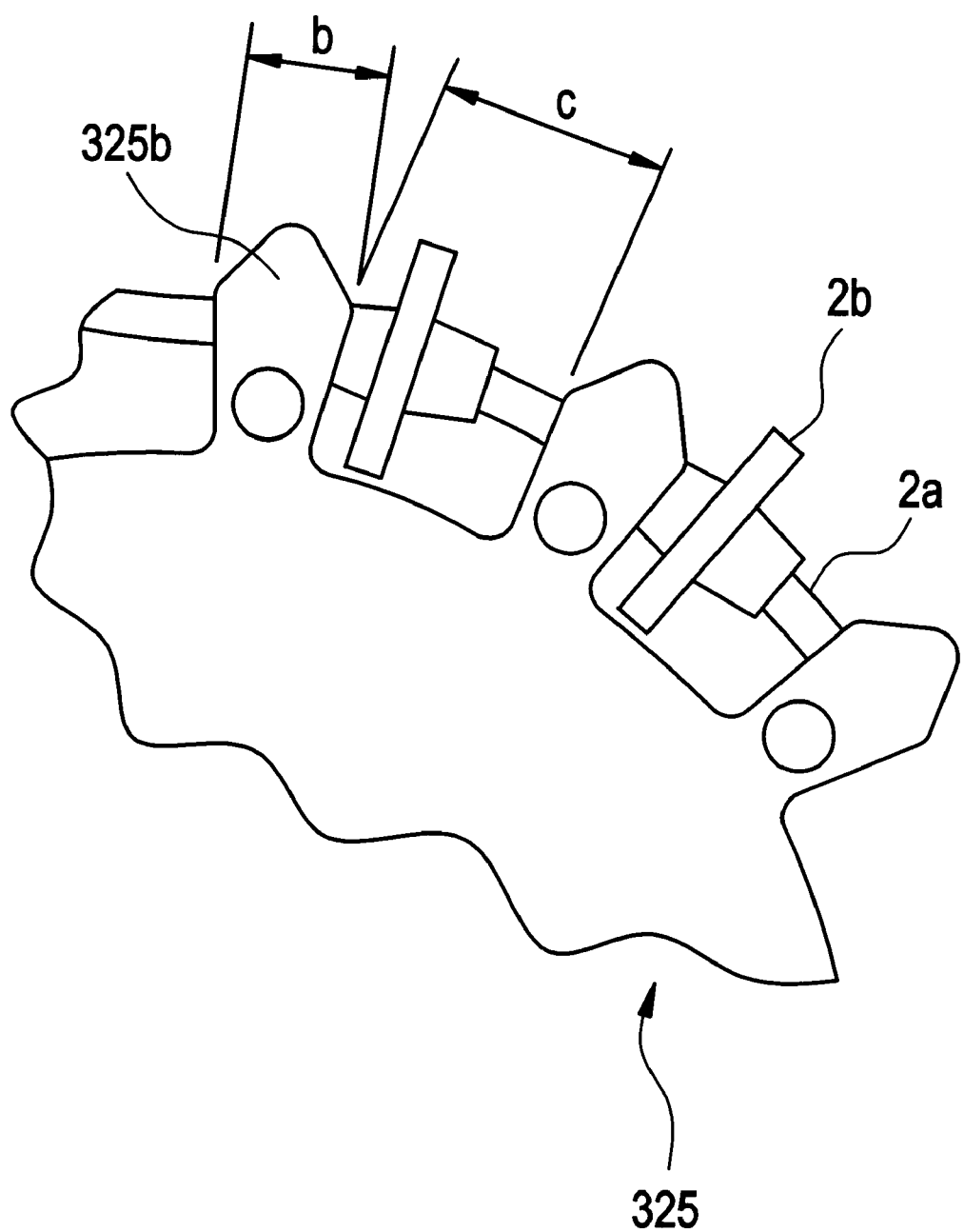
FIG. 24 is an enlarged view of a main part showing the tooth-form of a drive sprocket of FIG. 23.

As shown in FIG. 23, the drive sprocket 316 is comprised of a support 324, operating plates 325, 326 and connecting pins 327, 327, . . . , the support 324 has support shafts 324a, 324b projected on both sides, fitting holes 325a, 326a of the operating plates 325, 326 are fitted in a boss 324c and fixed by welding or the like, and the operating plates 325, 326 are connected together by connecting pins 327, 327, . . . .

The operating plates 325, 326 are formed in the circumferential parts with teeth 325b, 326b having a special shape, as shown in FIGS. 23 and 24. The teeth 325b, 326b are designed, different from teeth 640b of a conventional drive sprocket 640 shown in FIG. 25, so that the tooth width b is totally generally narrowed, the tooth width b from the root to the middle part is gradually widened, and the tooth width b from the middle part to the crest is gradually narrowed. A gap c between the teeth adjacent to each other is larger than the tooth width b.

The operating plates 325, 326 are formed with a plurality of windows 325c, 326c in a circumferential fixed spacing, as shown in FIG. 23.

In the corner joint 310, as shown in FIG. 21, one support shaft 324a of the drive sprocket 316 is fitted, in advance, into a rotational shaft inserting hole 318 of one cover 314, the other cover 315 is then placed on one cover 314, and the other support shaft 324b of the drive sprocket 316 is fitted into the rotational shaft fitting hole 319 of the other cover 315.

Fastening bolts 320 are inserted into fastening bolt holes 317, 317 formed in the covers 314, 315 and fastened by nuts 321 so that the drive sprocket 316 is rotatable within a sprocket housing part 323, to constitute the corner joint 310.

In the drive device 304, the other support shaft 324b of the drive sprocket 316 of the corner joint 310 is fitted into a fitting hole 311a of a shaft coupling 311, and a drive shaft 313a of the drive motor 313 is fitted into a fitting hole 311b of the shaft coupling 311.

One end 312a of the support member 312 is fastened to the cover 315 of the corner joint 310 by a plate screw 328 and a nut 329, the other end 212b is placed in contact with flange 313b of the drive motor 313, and the support shaft 324b and the drive shaft 313a are then fixed to constitute the drive device 304. To the corner joint 308 are applied the corner joints 8, 28 shown in FIGS. 3 and 4, the corner joint 48 shown in FIGS. 7 and 8, and the corner joint 68 shown in FIG. 12.

Figure 26:
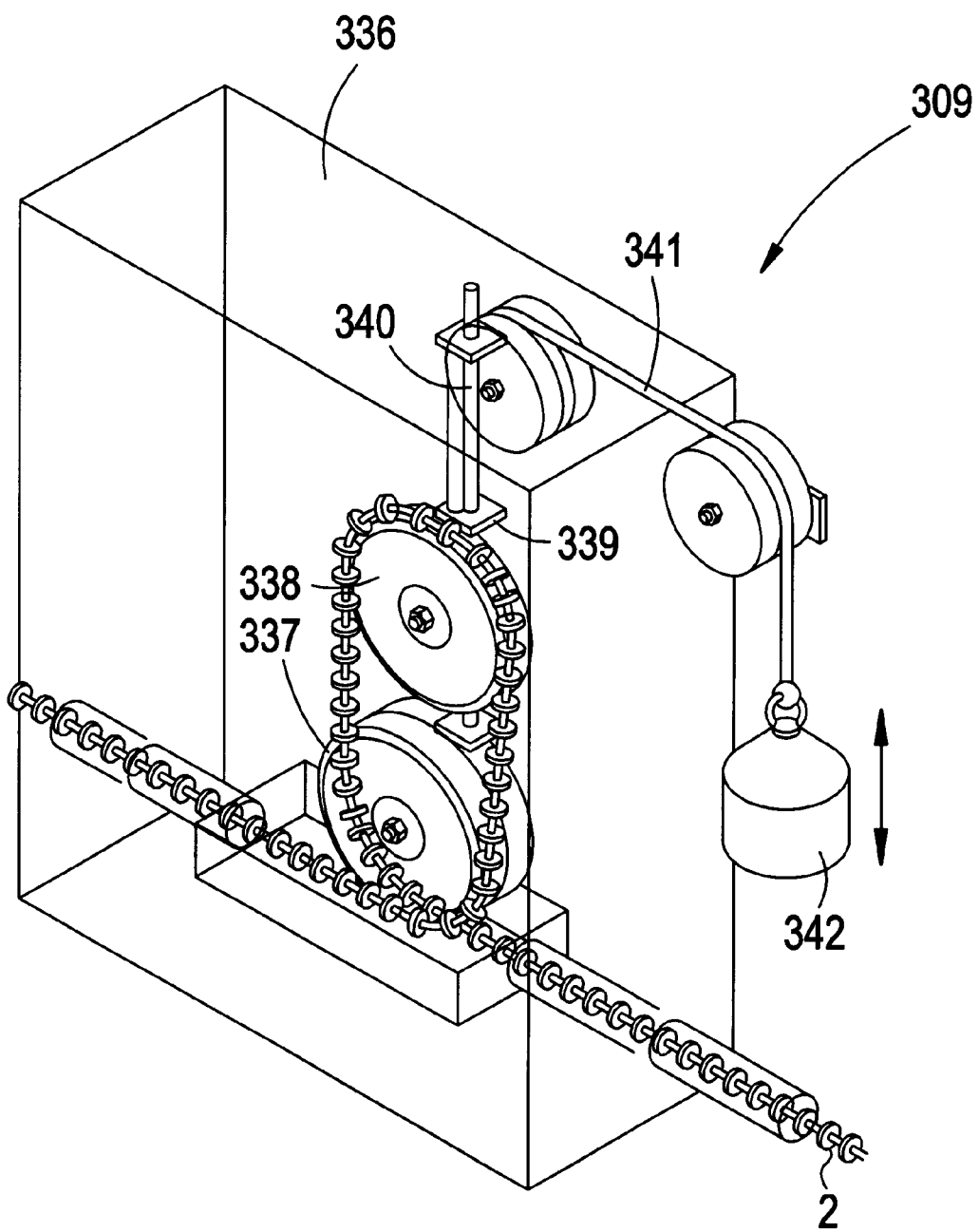
FIG. 26 is a perspective view of a tension applying device.

In the tension applying device 309, a fixed pulley 337 and a floating pulley 338 are disposed within a casing 336, as shown in FIG. 26, and the disk cable 2 is extended over the fixed pulley 337 and the floating pulley 338 for traveling. A support member 339 is secured to the floating pulley 338, the support member 339 is made movably up and down along a guide lever 340, one end of a wire 341 is secured to he support member 339, and a weight 342 is hung on the other end whereby the floating pulley 338 is always tensed upward to apply tension to the disk cable 2.

According to the tension applying device 309, the load corresponding to the weight of the weight 342 is always applied to the floating pulley 338, whereby fixed tension is always urged against the disk cable 2 extended over the floating pulley 338. Even if the length of the disk cable 2 is elongated due to the use for a long period, the floating pulley 338 is moved upward accordingly, but naturally, the load corresponding to the weight of a weight 342 is loaded on the floating pulley 338, and fixed tension is always urged against the disk cable 2.

According to the feed carrying apparatus 301 of the present invention, the drive device 304 is disposed at the corner 303a of the pipeline 303, and the drive sprocket 316 constituting the corner joint 310 is driven to move the disk cable 2. Therefore, the carrying resisting force in the corner 303a can be considerably reduced, and when the pipeline 303 is elongated and the corners 303a increases, the load applied to the disk cable 2 is not made so high, and no breakage likely occurs in a short period.

The drive sprocket 316 is constituted such that the operating plates 325, 326 are fitted in the boss 324c of the support 324, and the operating plates 325, 326 are connected together by the connecting pins 327, 327, . . . and the operating plates 325, 326 are formed with a plurality of windows 325c, 326c to make larger a space in which feed S may flow within the sprocket housing part 323 and also may flow passing through the plurality of windows 325c, 326c, whereby the frictional resistance with respect to feed S can be considerably reduced, and the drive sprocket 316 can be rotated smoothly.

Moreover, since the space in which feed S may flow is made large and may flow smoothly, feed S is not compressed and crushed in the narrow space within the wheel housing part 623 and the bent pipe 624, as in the conventional wheel 625, but feed S having an adequate grain size which is almost the same as the initial condition can be transported.

Further, the operating plates 325, 326 are formed with the teeth 325b, 326b having a special shape as mentioned above, and the gap c between the teeth adjacent to each other is made larger than the tooth width b. Therefore, even when tension of the disk cable 2 becomes weakened, the disk 2b of the disk cable 2 is not fallen out of the gap c between the teeth adjacent to each other, and the feed S present in the gap c between the teeth adjacent to each other applies no pressure to the disk 2b of the disk cable 2 to fall out the disk 2b.

The drive device 304 is disposed at the corner 303a to drive the drive sprocket 316 constituting the corner joint 310 so as to move the disk cable 2 on the same plane. Therefore, means for avoiding superposition of the disk cable 2 need not be provided, and even if strong tension is not always applied to the disk cable 2, the disk cable 2 is not disengaged from the drive sprocket 316.

Therefore, it is not necessary to arrange means for detecting the disengagement of the disk cable 2 to always monitor it, and of course, a mechanism for applying tension to the disk cable 2 in the drive device 304 need not be disposed, and the constitution of the drive device 304 is very simple and inexpensive.

Further, since the corner joint 310 constituting the drive device 304 is similar in constitution to the conventional corner joint except the drive sprocket 316, the wheel 625 housed in the corner joint 608 may be exchanged with the drive sprocket 316 in the conventional feed carrying apparatus 601. Work for re-laying the pipeline 603 is not necessary, and the drive device 304 can be installed simply. It is possible to select, as necessary, whether or not the drive device 304 is suitably disposed at the corner 603a, or whether or not the conventional corner joint 608 is disposed.

Further, the support shafts 324a, 324b are formed on both sides of the support 324 of the drive sprocket 316, and the drive motor 313 is connected to the corner joint 310 by the shaft coupling 311 and the support member 312. Therefore, according to the situation around the drive corner 303a, the shaft coupling 311 and the support member 312 are mounted on the suitable side of the corner joint 310, and the drive motor 313 can be installed on the suitable side easily.

Furthermore, since the drive motor 313 can be easily removed, where the teeth 325b, 326b of the operating plates 325, 326 become worn and broken, a separate drive sprocket 316 can be installed simply.

Further, since the drive device 304 of the present invention is disposed at the corner 303a in which feed S is present internally of the pipeline 303, it can be disposed in a pigsty, a henhouse or the like, and water-proof processing for preventing rain water or the like from entering need not be applied.

Moreover, since the drive device 304 of the present invention can be disposed at a plurality of corners 303a of the pipeline 403, the length of the driving disk cable 2 is not limited to about 200 m, but the feed S can be carried to a distant place.

The drive device 304 of the present invention is used together with the corner joints 8, 28, 48, and 58 whereby feed S can be carried very effectively and smoothly, and the constitution of the carrying apparatus 301 can be extremely simplified.

Figure 27:
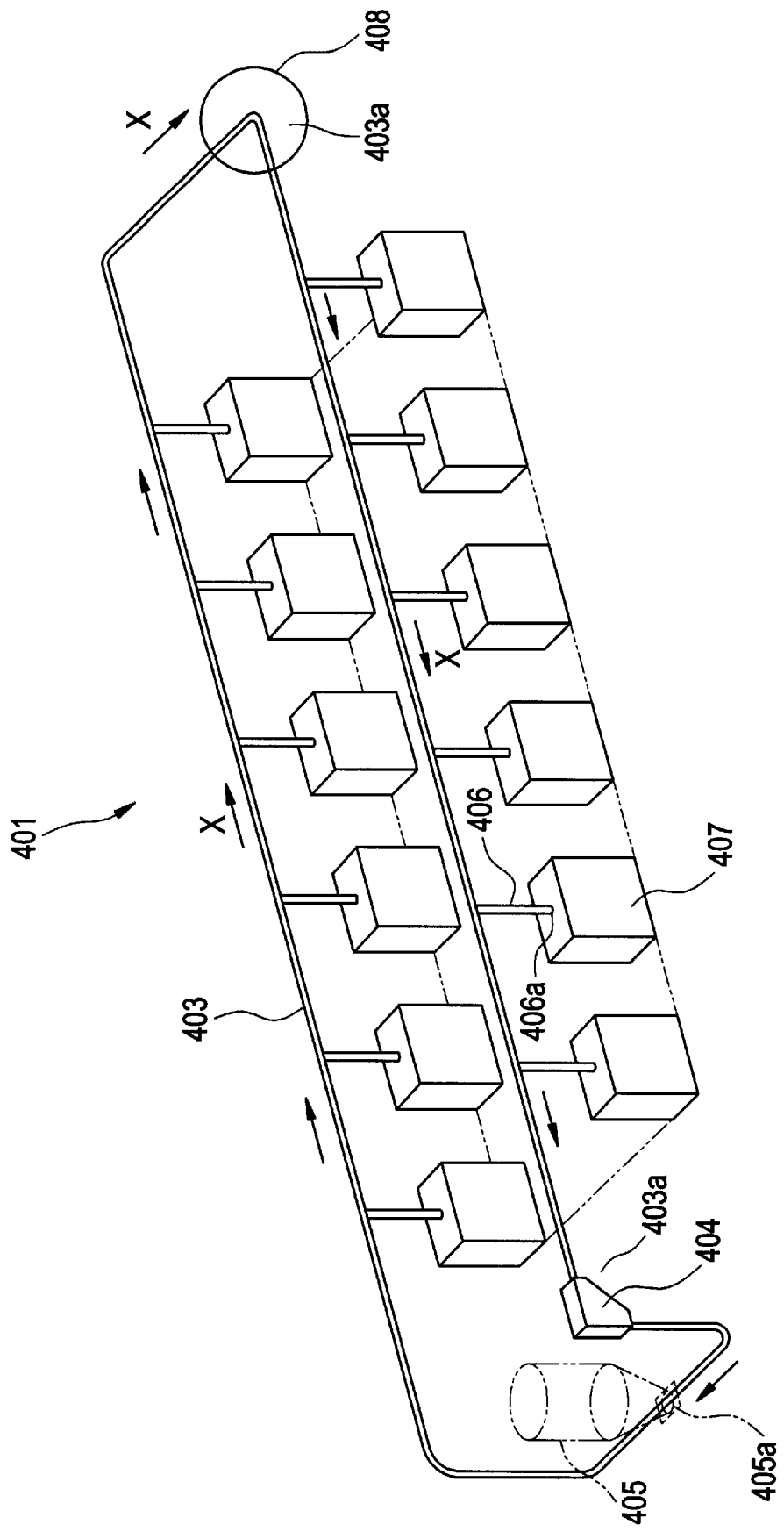
FIG. 27 is a perspective view of the entirety of a feed carrying apparatus of the present invention.
Figure 28A:
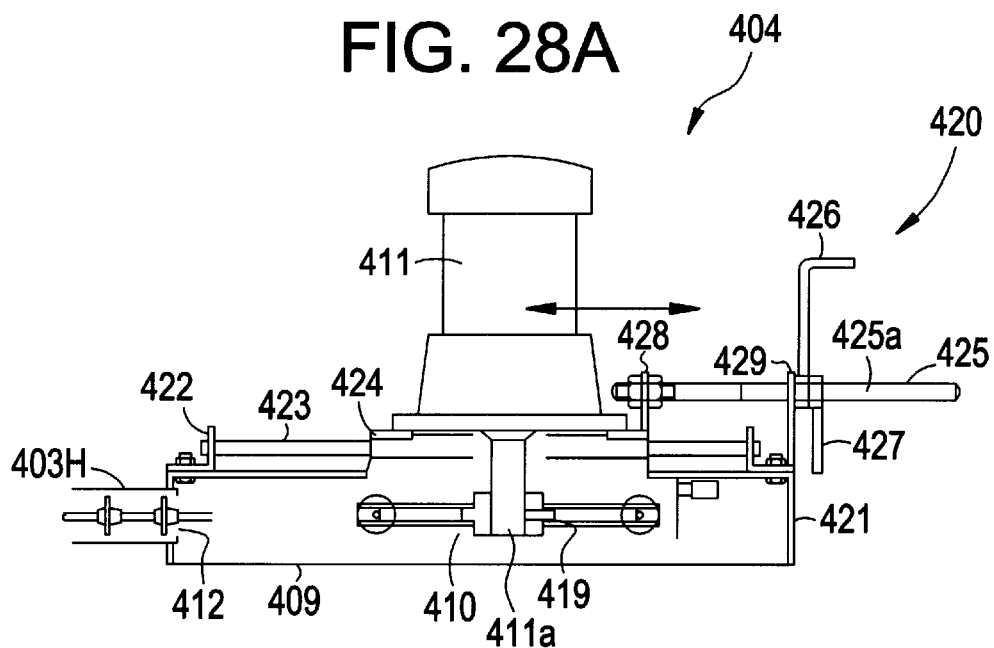
FIG. 28(A) is a plan sectional view and FIG. 28(B) is a front sectional view, respectively, of a drive device used in the feed carrying apparatus of FIG. 27.
Figure 28B:
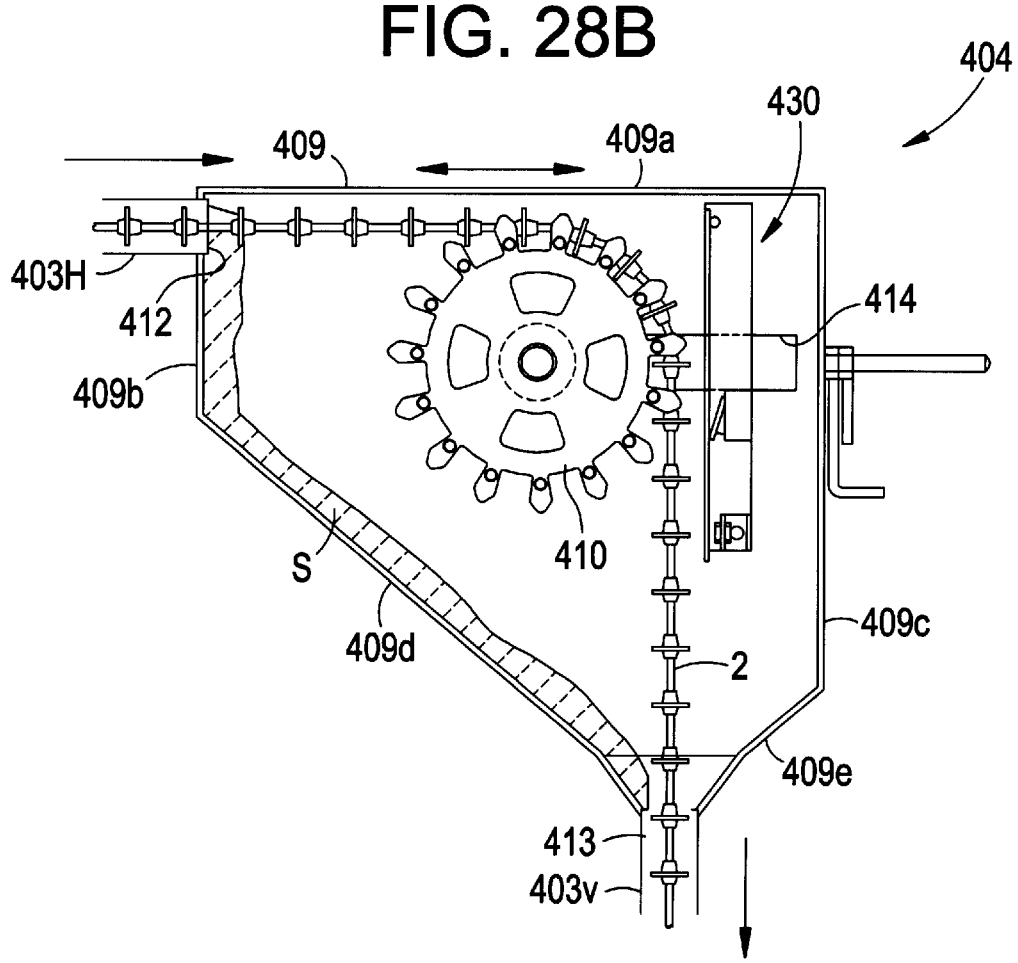
Figure 29B:
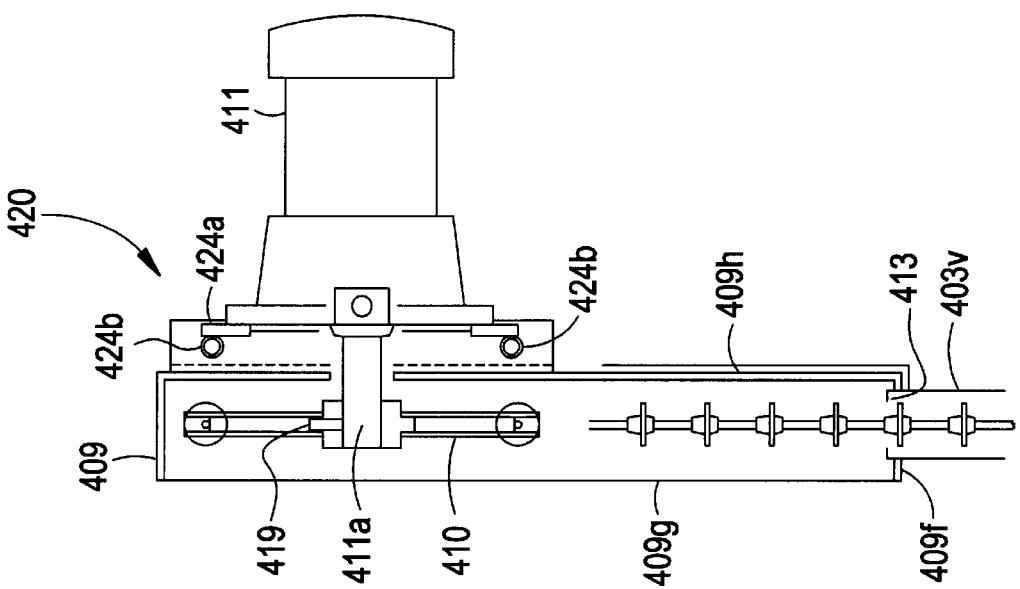
FIG. 29(A) is a back view and FIG. 29(B) is a side sectional view, respectively, of a drive device used in the feed carrying apparatus of FIG. 27.
Figure 29A:
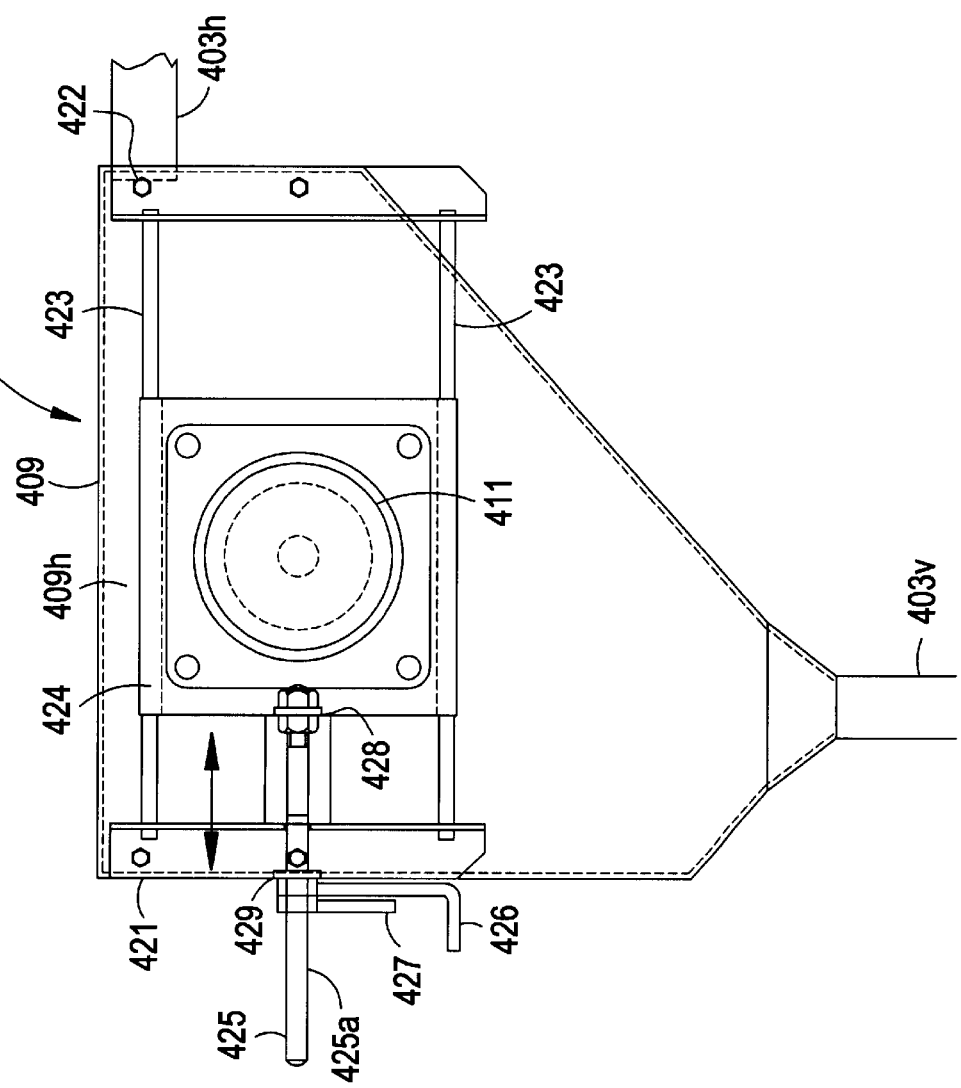
Figure 30B:
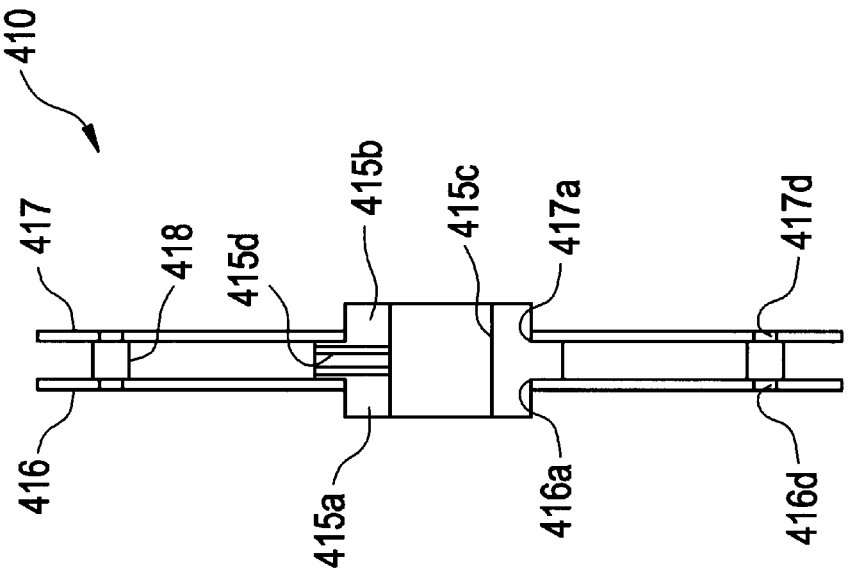
FIG. 30(A) is a front view and FIG. 30(B) is a side sectional view, respectively, of a drive sprocket.
Figure 30A:
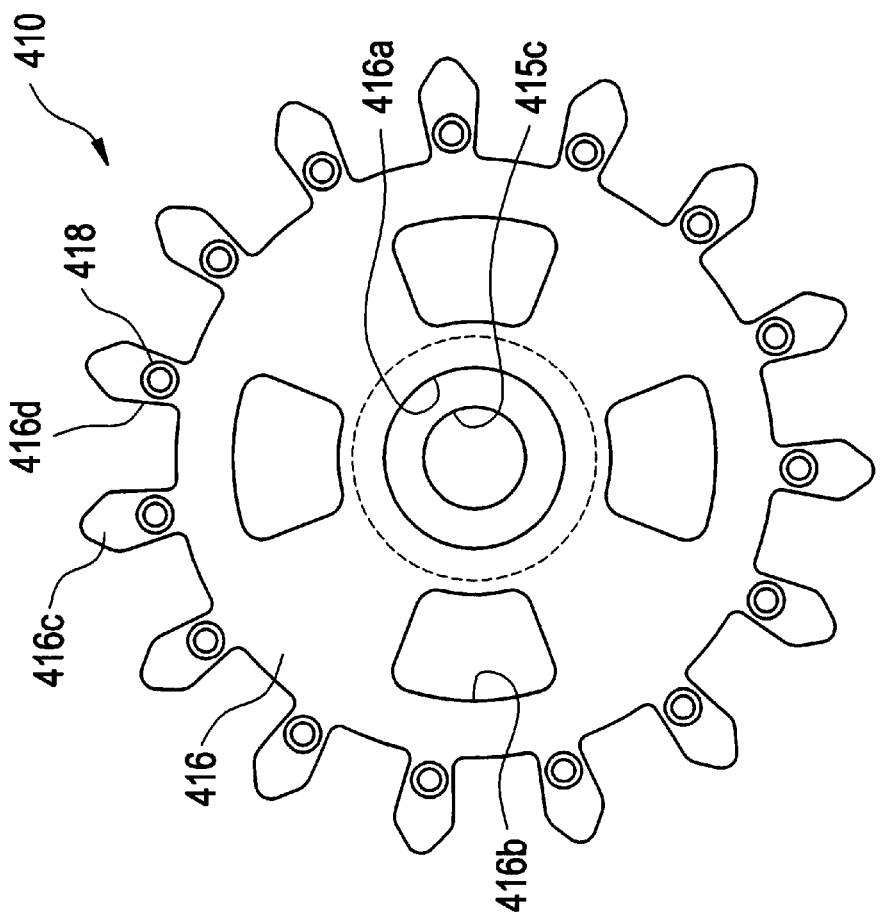

FIG. 27 is a perspective view of the entirety of another embodiment of a feed carrying apparatus according to a disk cable type of the present invention; FIG. 28(A) is a plan sectional view and FIG. 28(B) is a front sectional view, respectively, of a drive device used in the feed carrying apparatus of FIG. 27; FIG. 29(A) is a back view and FIG. 29(B) is a side sectional view, respectively, of a drive device used in the feed carrying apparatus of FIG. 27; FIG. 30(A) is a front view and FIG. 30(B) is a side sectional view, respectively, of a drive sprocket; and FIG. 31 is an enlarged view of a main part showing the tooth-form of a drive sprocket of FIG. 30.

In the feed carrying apparatus 401, a number of feeding units 407, 407, . . . are disposed through feed falling-down pipes 406, 406, . . . held in a fixed spaced relation on a pipeline 403 connected endlesswise, and a disk cable 2 having disks 2b secured to a flexible wire 2a connected endlesswise in a fixed spaced relation is inserted into the pipeline 403, similarly to the conventional feed carrying apparatus.

A drive device 404 or a corner joint 408 is disposed at a corner 403a of the pipeline 403.

The construction of the disk cable 2, the feed hopper 645, the feed falling-down pipe 406, and the feeding unit 407 is similar to those of the feed carrying apparatus 1 of FIG. 1.

In the drive device 404, as shown in FIG. 28, a drive sprocket 410 is disposed within a casing 409, the disk cable 2 is extended over the drive sprocket 410, and the drive sprocket 410 is driven by a drive motor 411 to cause the disk cable 2 to travel.

The casing 409 comprises an upper side wall 409a, side walls 409b, 409c, inclined walls 409d, 409e, a bottom wall 409f, a front wall 409g, and a back wall 409h, and the side wall 409b is formed in its upper end with a cable introducing port 412 and the bottom wall 409f formed with a cable discharge port 413. The bottom wall 409f is formed with a sliding cutaway part 414 in a horizontal direction.

One ends of pipeline 403, 403 are connected to the cable introducing port 412 and the cable discharge port 413, respectively, so that feed S carried from a piping 403H arranged horizontally is introduced into the casing 409 from the cable introducing port 412, flows downward along the inclined wall 409d, and is discharged to a piping 403V disposed vertically from the cable discharge port 413.

The drive sprocket 410 is disposed substantially in the upper central part in the casing 409, and comprises a support 415, operating plates 416, 417, and connecting pins 418, 418, . . . .

The support 415 is formed on both sides thereof with projecting parts 415a, 415b, and formed in the central part with a fitting hole 415c, and a threaded hole 415d is formed at right angles to the fitting hole 415c.

The operating plates 416, 417 are formed in the central part with fitting holes 416a, 417a, around which are formed a plurality of windows 416b, 417b in a fixed spaced relation in the circumferential direction. Further, teeth 416c, 417c having a special shape are formed in the peripheral part, the teeth 416c, 417c being formed with connecting holes 416d, 417d, respectively.

The projecting parts 415a, 415b of the support 415 are fitted in the fitting holes 416a, 417a of the operating plates 416, 417 and fixed by welding or the like. The operating plates 416, 417 are connected together by fitting both ends of the connecting pins 418, 418 into the connecting holes 416d, 417d to weld them.

A drive shaft 411a of the drive motor 411 is fitted into a fitting hole 415c, a stop screw 419 is engaged with a threaded hole 415d, and the drive shaft 411a is pressed by the stop screw 419 whereby the drive sprocket 410 is secured to the drive shaft 411a.

Figure 25:
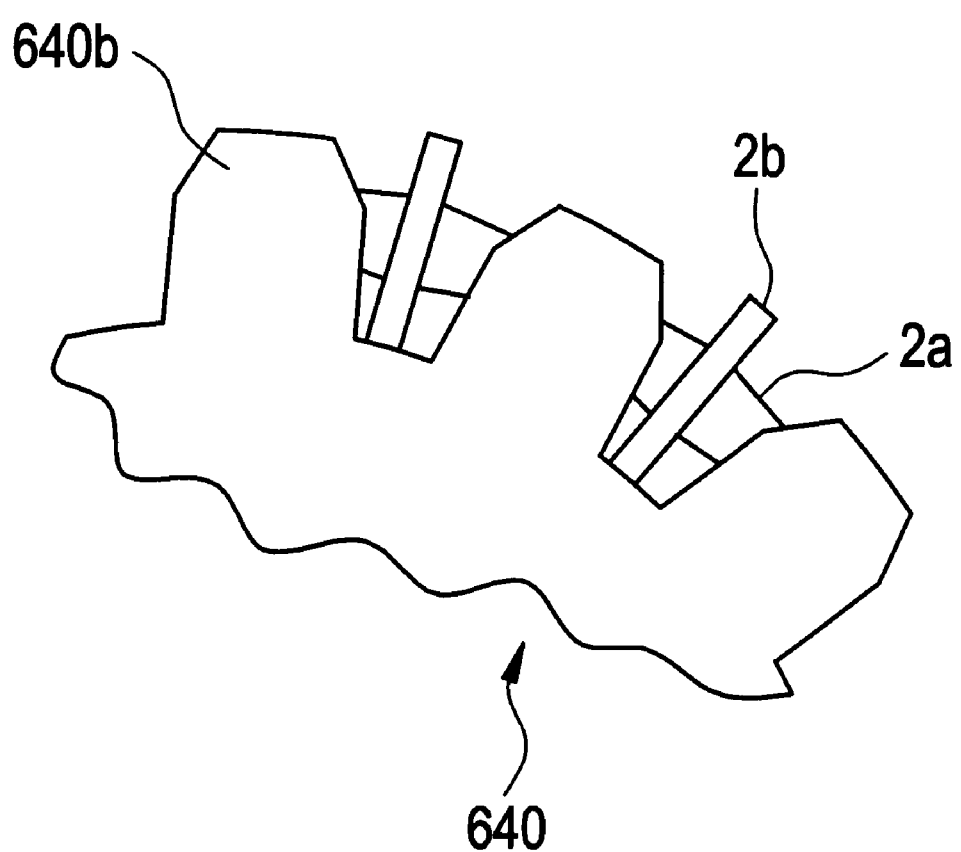
FIG. 25 is an enlarged view of a main part showing the tooth-form of a conventional drive sprocket.

The teeth 416c, 417c having a special shape are designed, as shown in FIGS. 30 and 31, different from the teeth of the conventional drive sprocket shown in FIG. 25, so that the tooth width b is totally generally narrowed, the tooth width b from the root part to the middle part is gradually widened, and the tooth width b from the middle part to the root part is gradually narrowed. The gap c between the teeth adjacent to each other is larger than the tooth width b.

A motor sliding mechanism 420 is disposed on the back of the casing 409, as shown in FIGS. 28 and 29, the motor sliding mechanism 420 comprising support members 421, 422, guide levers 423, 423, a motor fixing plate 424, an operating shaft 425, a handle 426, and a stopper 427.

The support members 421, 422 are secured to both ends of the back wall 409h of the casing 409, and the support members 421, 422 support both ends of the guide levers 423, 423.

In the motor fixing plate 424, circular pipes 424b, 424b are secured by welding or the like to the upper and lower ends of the flat plate 424a, and the guide levers 423, 423 are inserted into the circular pipes 424b, 424b so that the motor fixing plate 424 may be slidably moved along the guide levers 423, 423.

The operating shaft 425 has one end secured to the central part on one side of the motor fixing plate 424 through the support member 428, the middle part thereof being inserted into and supported in the inserting bole 429a of the support member 429, a female thread part 426a formed in the proximal end of the handle 426 and a female thread part 427a formed in the proximal end of the stopper 427 being engaged with a male thread part 425a of the operating shaft 425.

Figure 32:
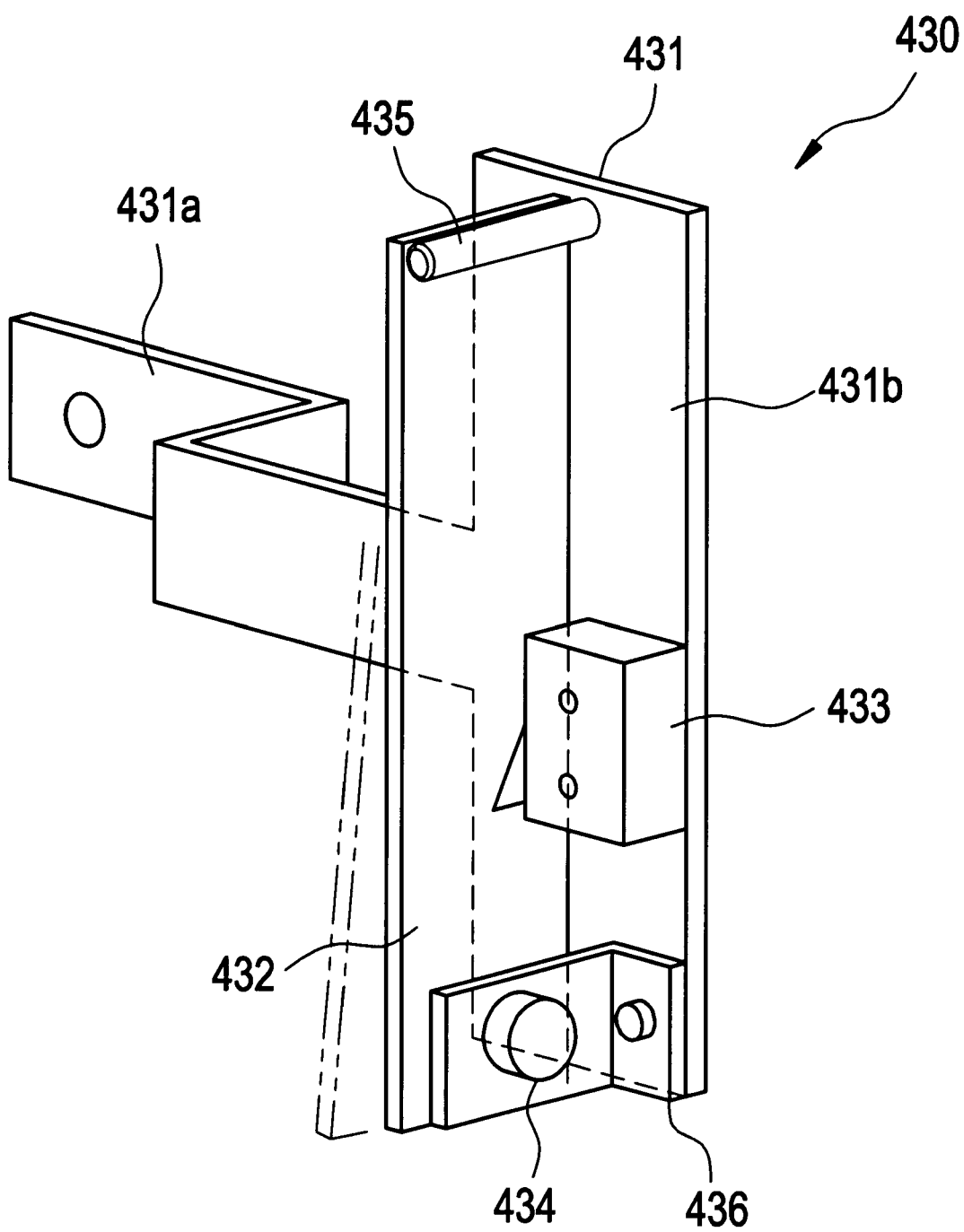
FIG. 32 is a perspective view of a motor stop mechanism.

A motor stop mechanism 430 is disposed on the upper-right side in the casing 409, as shown in FIGS. 28 and 32, the motor stop mechanism 430 comprising a support plate 431, a swing plate 432, a limit switch 433, and a magnet 434.

In the support plate 431, as shown in FIG. 28 and 32, a bent plate 431a is projected externally of the casing 409 from the sliding cutaway part 414 formed in the back wall 409h of the casing 409, and secured to the motor fixing plate 424, and a rectangular plate 431b thereof is arranged in the vicinity on the right side of the drive sprocket 410.

The swing plate 432 is supported slidably on the support plate 431 through the support shaft 435, but is normally in the state suspended in a vertical direction as shown in FIG. 32.

A limit switch 433 is secured to the middle part of the support plate 431, and a magnet 434 secured to the lower end through the support member 436.

According to the drive device 404, first, the stopper 427 is rotated to assume the state that the handle 426 may be rotated, the handle 426 is then rotated to move the operating shaft 425 to suitably slidably move the drive motor 411 in a horizontal direction; then, the stopper 427 is reversal rotated to assume the state that the handle 426 may not be rotated to enable application of adequate tension to the disk cable 2.

The disk cable 2 having traveled substantially in the horizontal direction within the piping 403H in the state with the adequate tension applied is introduced into the casing 409 from the cable introducing port 412 and applied with the driving force by the drive sprocket 410, and changed in direction by approximately 90° so that it travels substantially in the vertical direction, and discharged from the cable discharge port 413 to the piping 403V.

On the other hand, feed S having been transported from the piping 403H is introduced from the cable introducing port 412 into the casing 409, is flown down along the inclined wall 409d due to the gravity, and is discharged from the cable discharge port 413 to the piping 403V disposed in the vertical direction.

To the corner joint 408 are applied the corner joints 8, 28 shown in FIGS. 3 and 4, the corner joints 48 shown in FIGS. 7 and 8, or the corner joint 68 shown in FIG. 12.

According to the present invention, the drive device 404 is disposed at the corner 403a, and the drive sprocket 410 also serving as the corner joint is driven so as to move the disk cable 2 on the same plane. Therefore, means for avoiding superposition of the disk cable 2 need not be provided, and even if strong tension is not always applied to the disk cable 2, the disk cable 2 is not disengaged from the drive sprocket 410.

According to the drive device 404, feed S having been transported from the piping 403H is flown down along the inclined wall 409d due to the gravity, and is discharged from the cable discharge port 413 to the piping 403V disposed in the vertical direction; and since the drive sprocket 410 is arranged at a position separately from the inclined wall 409d, the feed S is neither gradually accumulated within the drive device 404 nor moved into the shaft of the drive sprocket 410.

Further, in the drive device 404, a position of disposition thereof can be suitably selected as far as the corner 403a of the pipeline 403, in terms of mechanism, and therefore, if it is disposed within a pigsty, a henhouse or the like, no consideration need be taken about application of water-proof measures so as to prevent rain water or the like from entering.

Further, since a plurality thereof can be disposed within the pipeline 403 channel, the length of the driving disk cable 2 can be extended to a considerable extent as compared with prior art, not requiring the provision of a plurality of the feed carrying apparatuses 401.

Figure 33A:
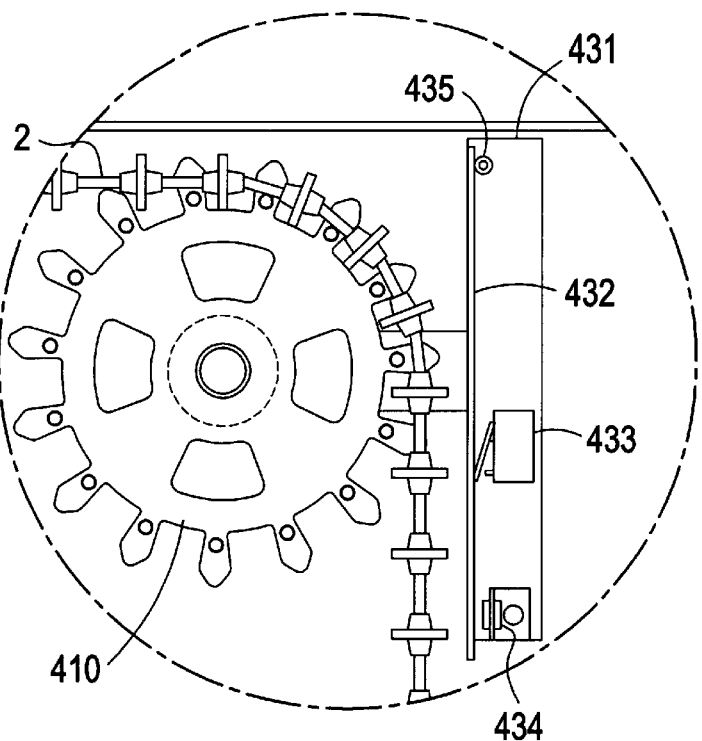
FIGS. 33A, 33B are explanatory views showing operation of a motor stop mechanism.
Figure 33B:
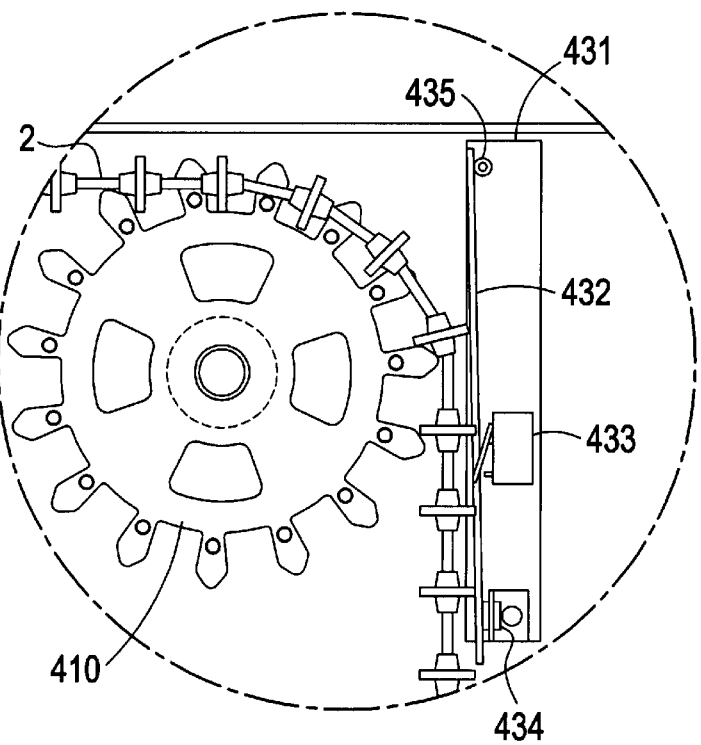
Figure 34:
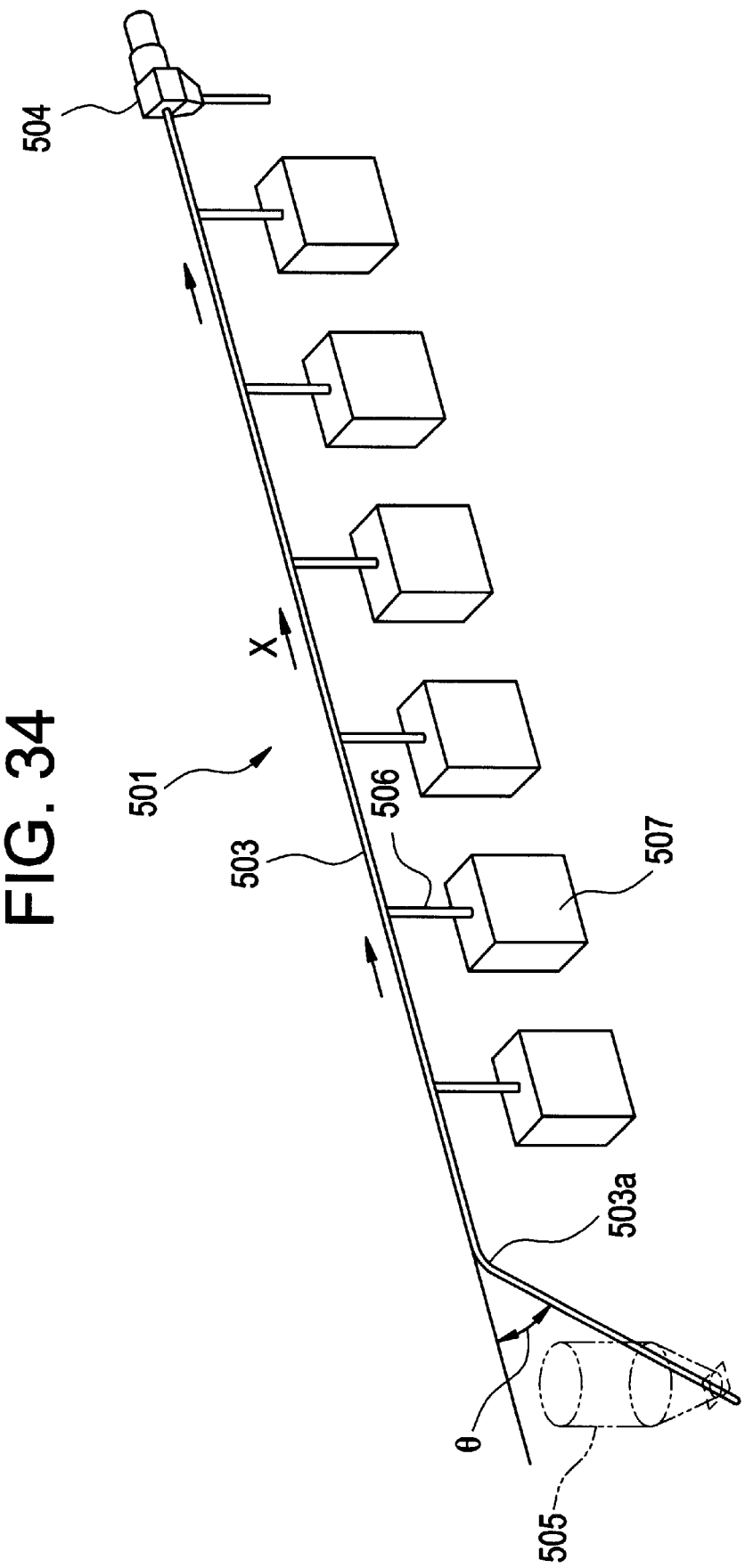
FIG. 34 is a perspective view of the entirety of an embodiment of a conventional feed carrying apparatus.
Figure 35:
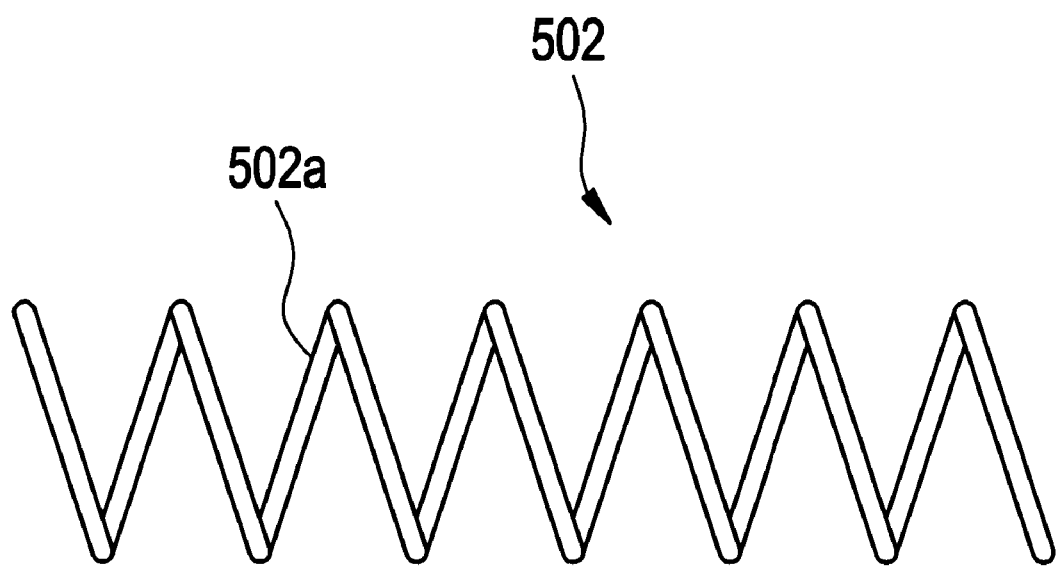
FIG. 35 is a front view of a part of a centerless auger.
Figure 36:
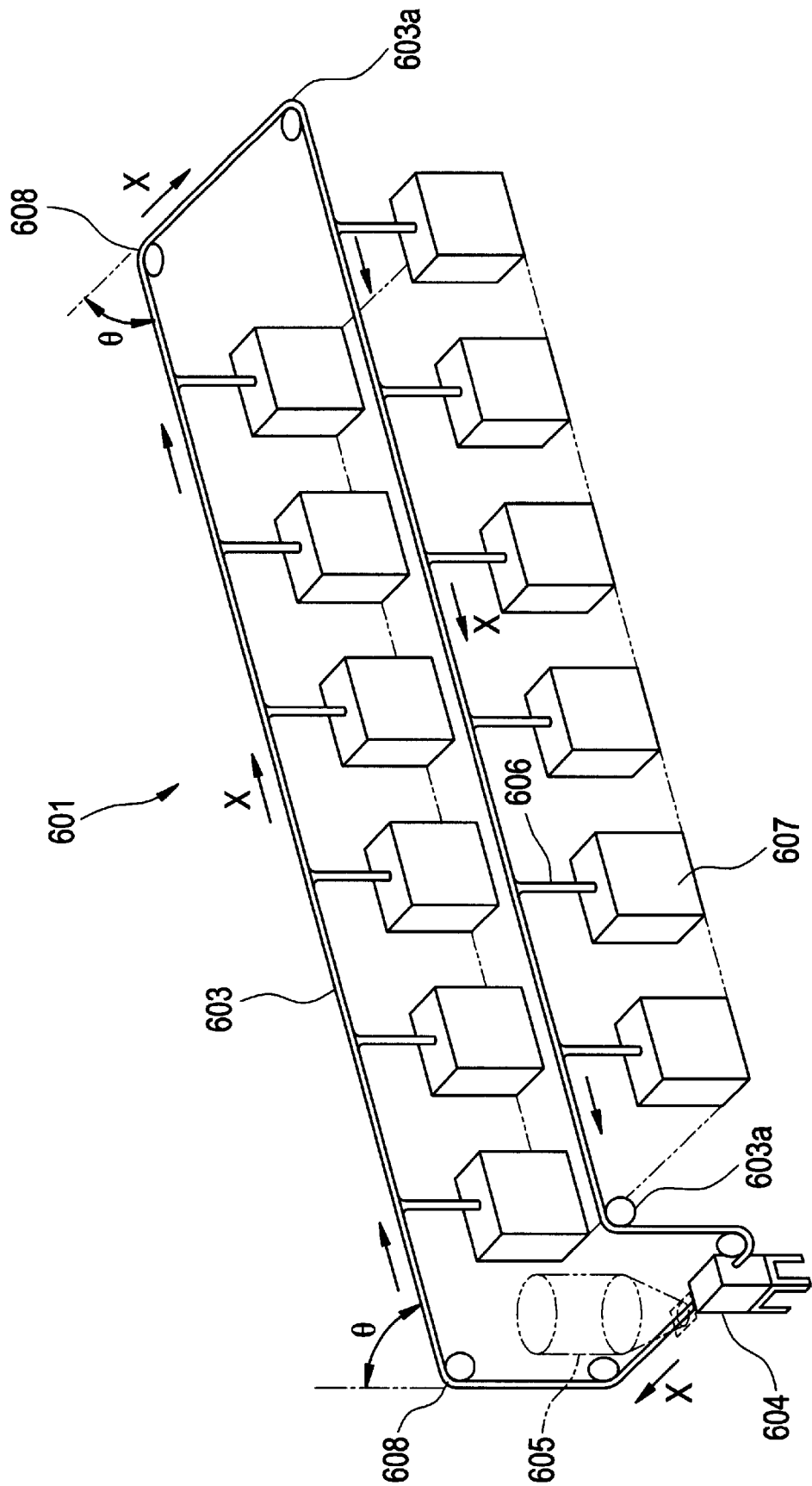
FIG. 36 is a perspective view of the entirety of a further embodiment of a conventional feed carrying apparatus.
Figure 37:
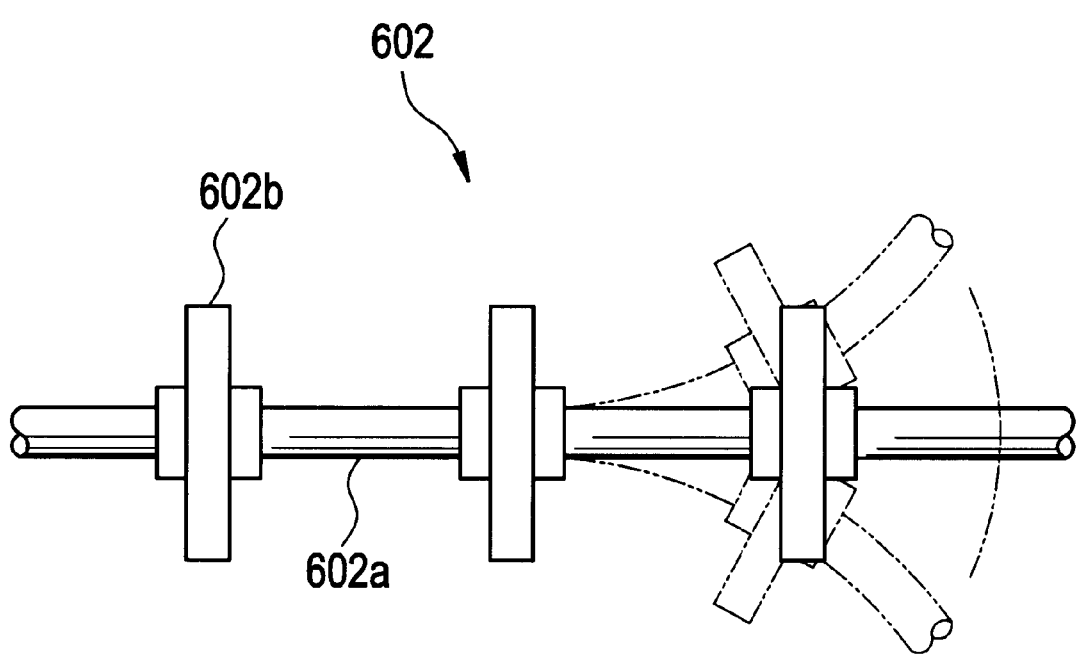
FIG. 37 is a front view of a part of a disk cable.
Figure 38B:
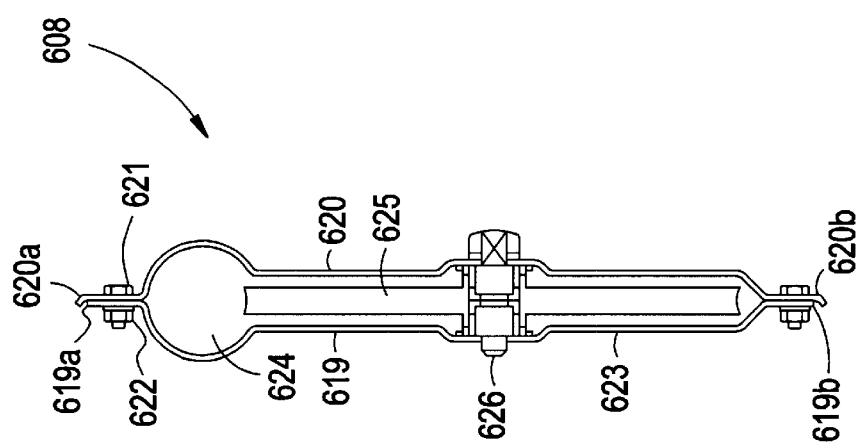
FIG. 38(A) is a front view and FIG. 38(B) is a side sectional view, respectively, of a corner joint used in the feed carrying apparatus of FIG. 36.
Figure 38A:
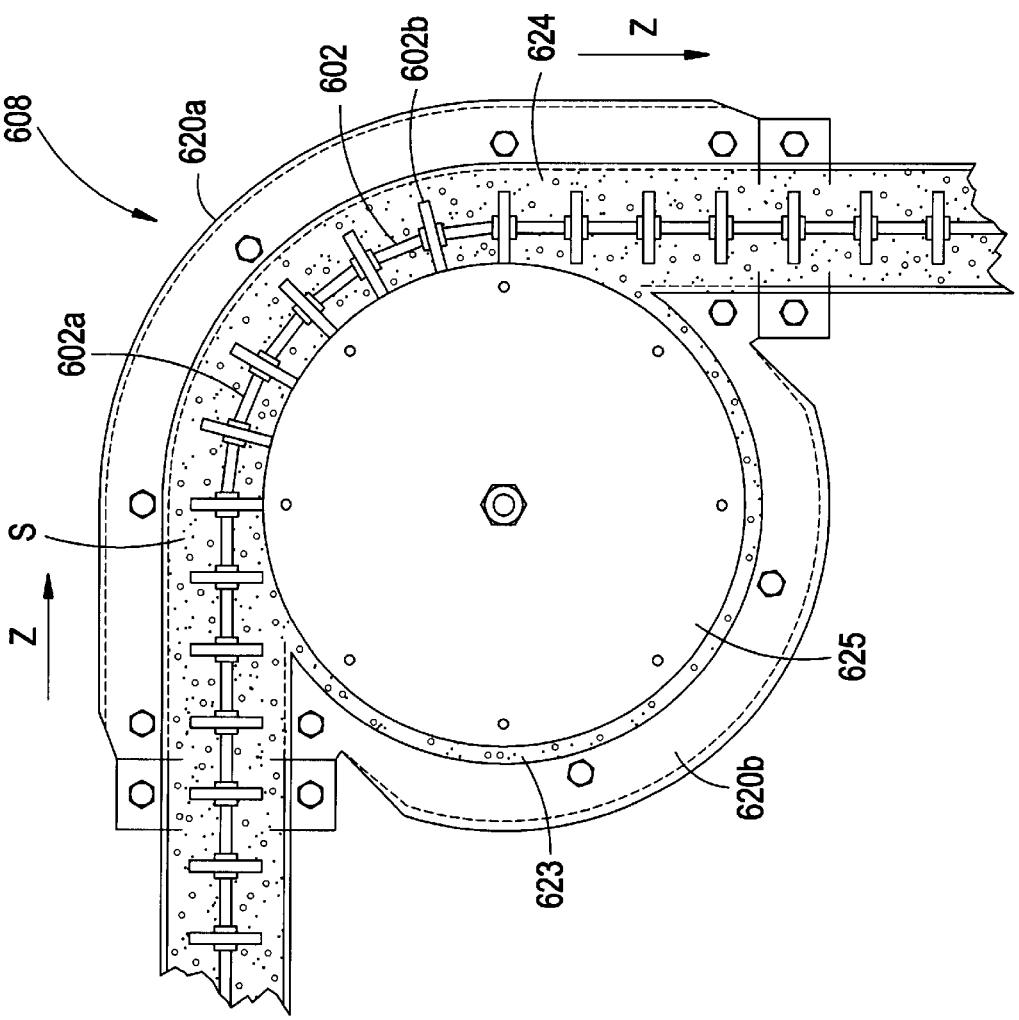
Figure 41A:
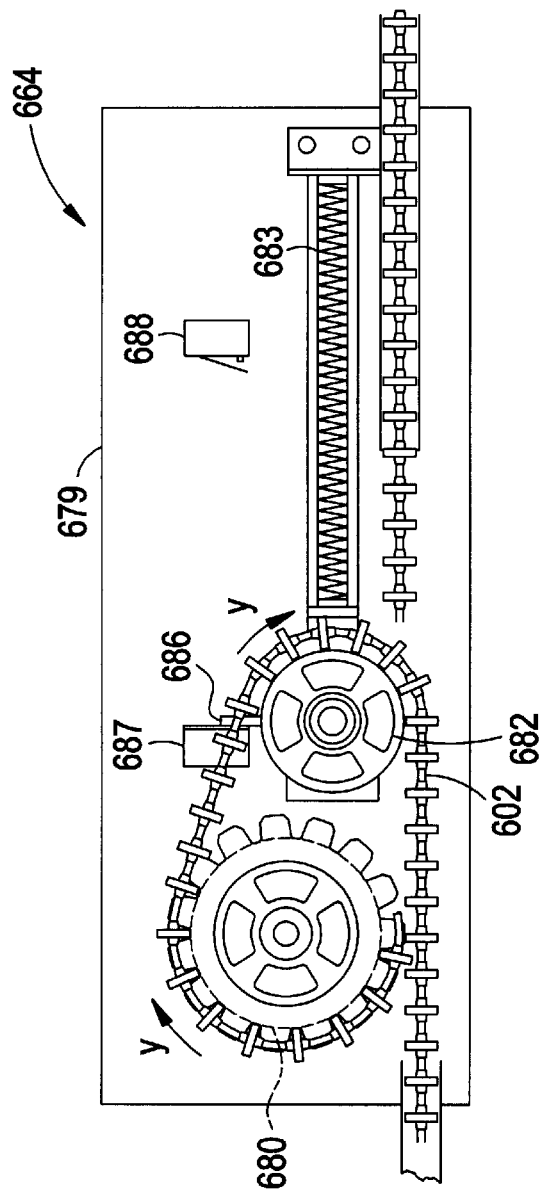
FIG. 41(A) is a front sectional view showing the condition at the time of high load and FIG. 41(B) is a front sectional view showing the condition at the time of breakage of a wire, respectively, of the drive device of FIG. 40.
Figure 41B:
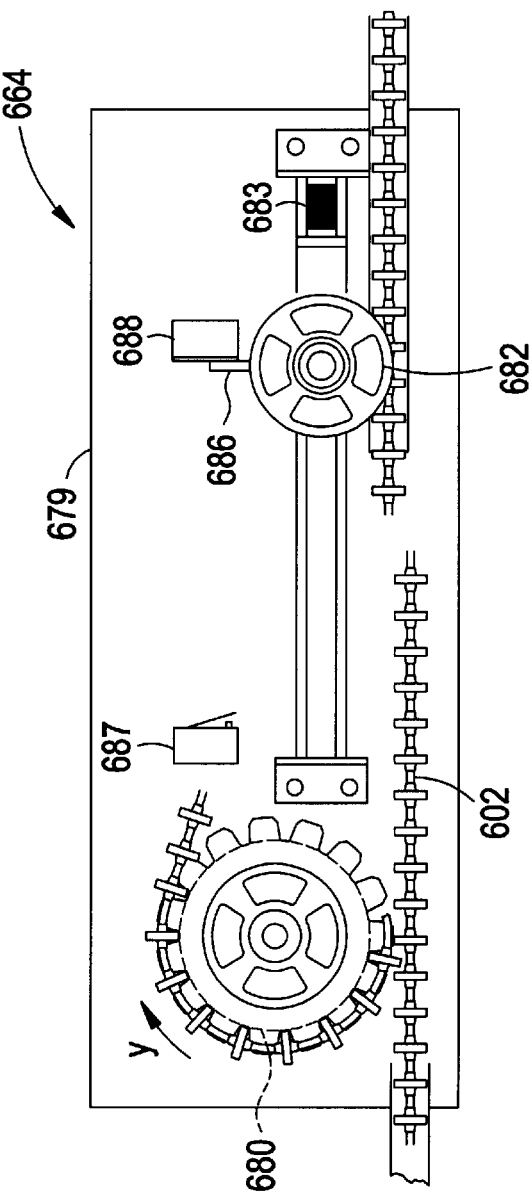
Figure 42:
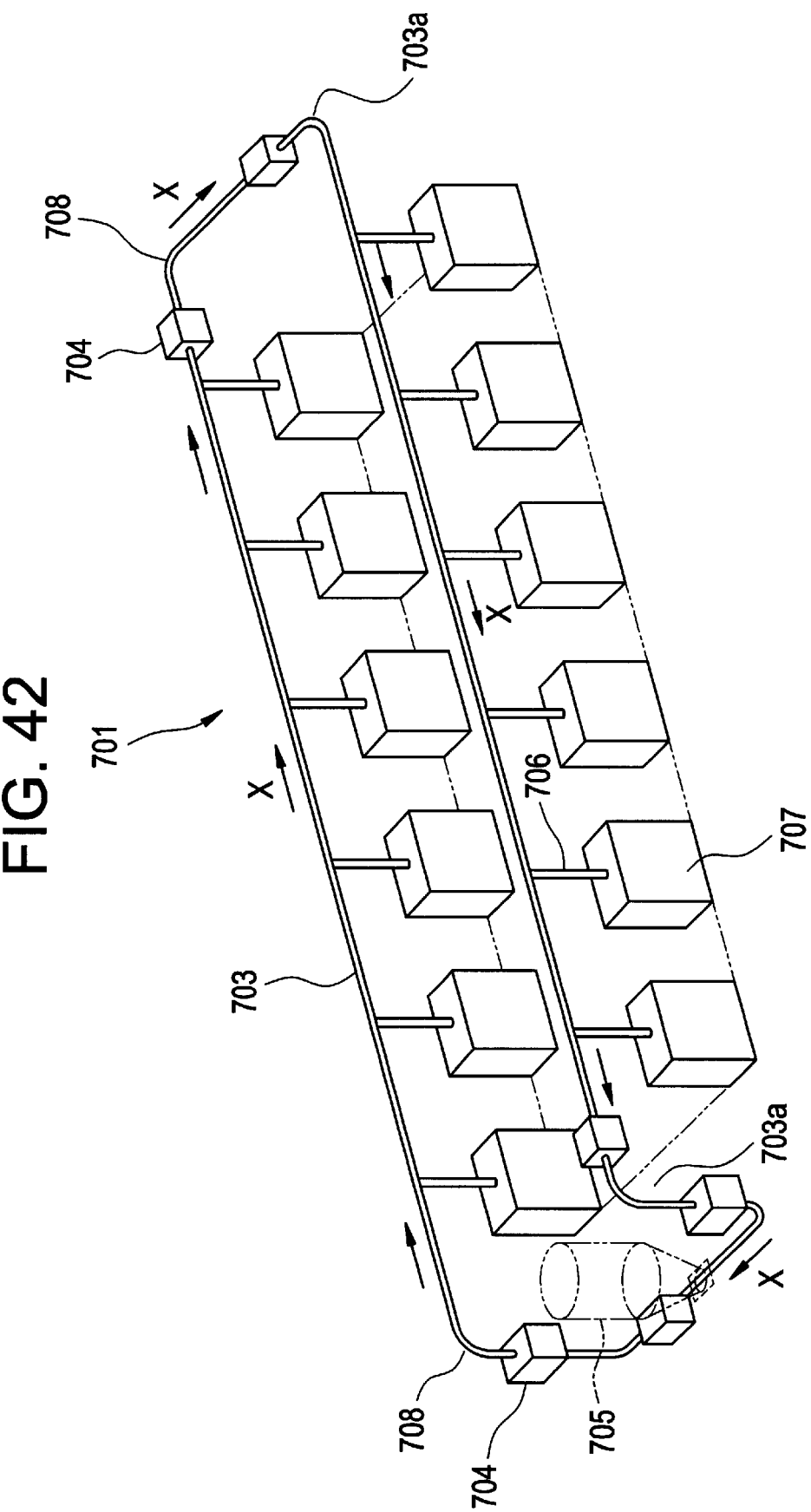
FIG. 42 is a perspective view of the entirety of a further embodiment of a conventional feed carrying apparatus.
Figure 43:
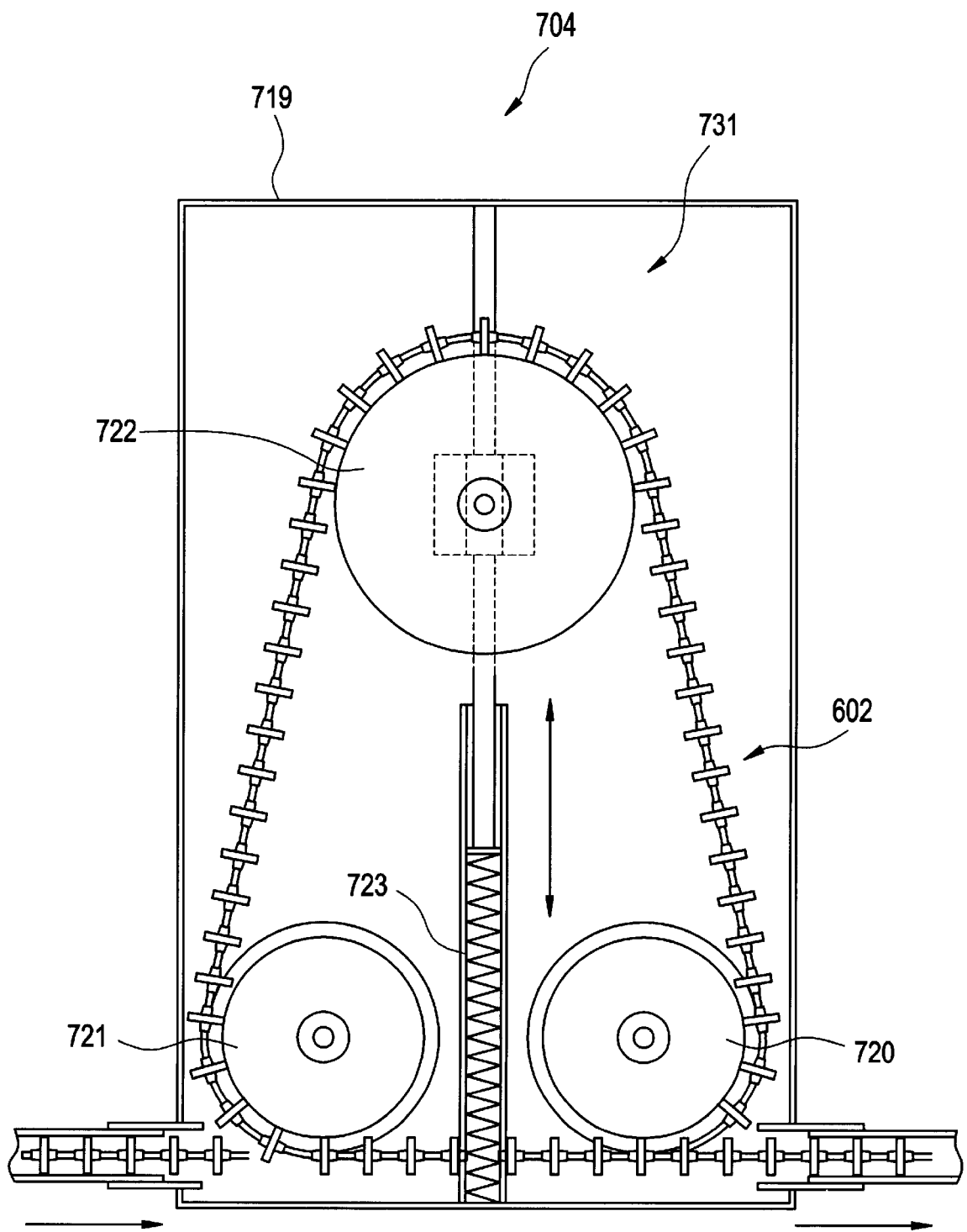
FIG. 43 is a front sectional view of the entirety of a drive device used in the feed carrying apparatus of FIG. 42.
Figure 44:
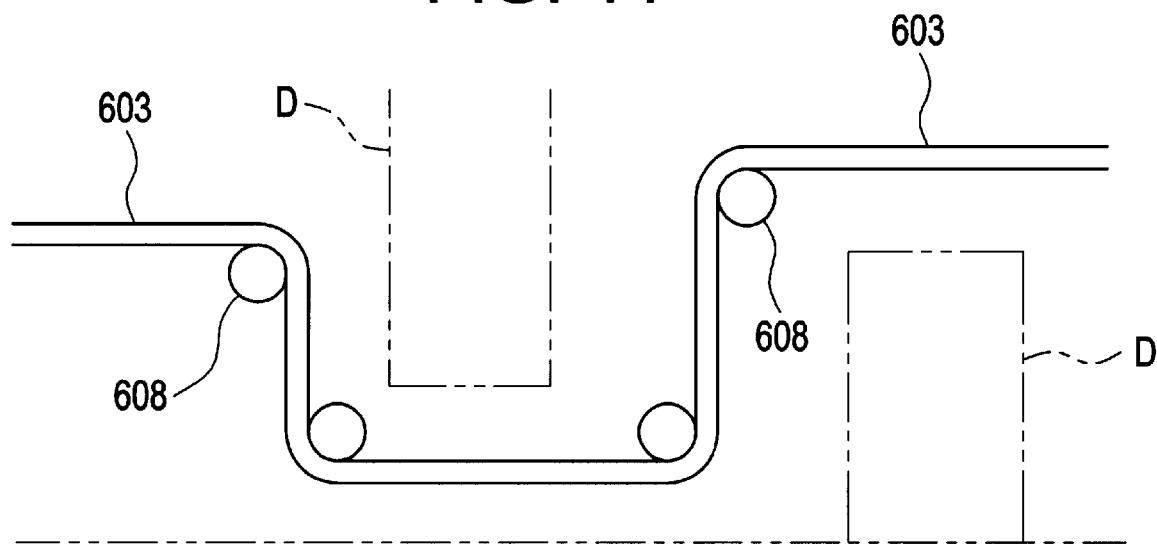
FIG. 44 is an explanatory view showing one example of a pipeline channel of a feed carrying apparatus of FIG. 36.
Figure 45:
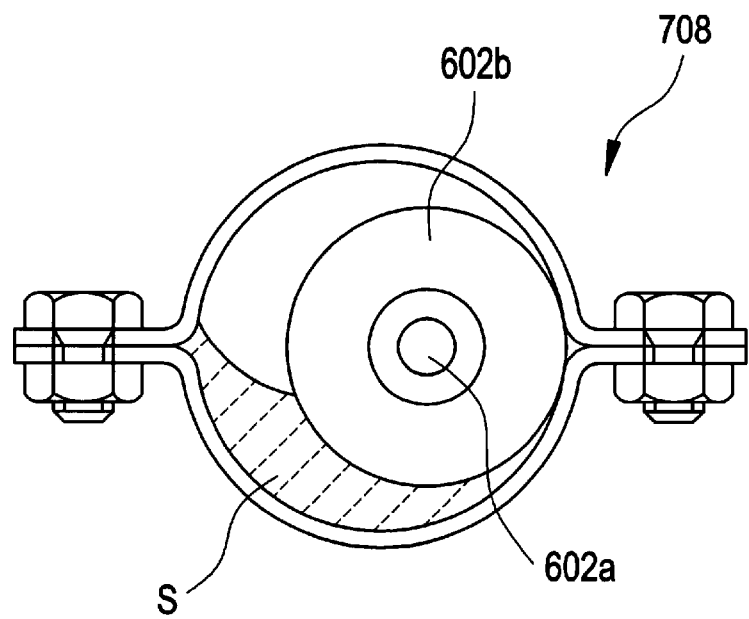
FIG. 45 is a sectional view showing the condition that feed is transported along a corner joint portion used in the feed carrying apparatus of FIG. 42.

According to the drive device 404, the disengagement of the disk cable 2 from the drive sprocket 410 scarcely occurs, but if the disk cable 2 should be disengaged from the drive sprocket 410 or the disk cable 2 should be broken, or the disk cable 2 should be elongated, the disk cable 2 presses the swing plate 432, and the swing plate 432 swings to the right hand, as shown in FIG. 33(B). At that time, since the swing plate 432 is adsorbed by the magnet 434, the operating lever 433a of the limit switch 433 is to be pressed positively.

Thereby, it is possible to always monitor the state that the disk cable 2 is disengaged, the breakage occurs, or the disk cable 2 is elongated.

Further, where an operator immediately performs re-mounting or re-adjustment, in the drive device 404, the floating pulley is not present, and the disk cable 2 is extended by mere ¼ over the drive sprocket 410, thus making the mounting and adjusting work extremely easy.

The drive device 404 is used jointly with the corner joint 408 whereby feed S can be carried extremely efficiently and smoothly, and in addition, the constitution of the feed carrying apparatus 401 can be extremely simplified.

What is claimed is:

1. A feed carrying apparatus for carrying feed to a number of feeding units through pipeline from a feed hopper, characterized in that a corner joint formed with a plurality of stationary friction-reducing projections which project inwardly is disposed on a bent pipe part.

2. A feed carrying apparatus for carrying feed by traveling a disk cable connected endlessly in a pipeline connected endlessly, characterized in that a corner joint formed with a plurality of stationary disk-contacting projections which project inwardly is disposed on a bent pipe part.

3. The feed carrying apparatus according to claim 2, wherein in said corner joint has the bent pipe forming members formed at the bent pipe part with a plurality of disk-contacting projections which project inwardly connected thereto.

4. The feed carrying apparatus according to claim 1 or 2, wherein said corner joint comprises bent pipe forming members formed at the bent pipe part with a plurality of projections which project inwardly, and a plurality of contact members curved with the radius of curvature corresponding to the bent pipe part.

5. The feed carrying apparatus according to claim 4, wherein in said corner joint, said contact members are exchangeable.

6. The feed carrying apparatus according to claim 5, wherein in said corner joint has the bent pipe forming members formed at the bent pipe part with a plurality of projections which project inwardly connected thereto.

7. The feed carrying apparatus according to claim 4, wherein in said corner joint has the bent pipe forming members formed at the bent pipe part with a plurality of projections which project inwardly connected thereto.

8. The feed carrying apparatus according to claim 1, wherein said corner joint has bent pipe forming members formed at the bent pipe part with a plurality of friction-reducing projections which project inwardly connected thereto.

9. A feed carrying apparatus for carrying feed by traveling a disk cable connected endlessly in a pipeline connected endlessly, said apparatus comprising a disk cable tension regulating mechanism in which a load, corresponding to the weight of a weight, is loaded, whereby fixed tension is always applied to the disk cable.

10. The feed carrying apparatus according to claim 9, wherein said disk cable tension regulating mechanism is so designed that a floating pulley housed in a drive device is pulled by a weight through a wire.

11. The feed carrying apparatus according to claim 9, wherein said disk cable tension regulating mechanism is so designed that an outer piping slidable in an inner piping is pulled by a weight through a wire.

12. A feed carrying apparatus for carrying feed by traveling a disk cable connected endlessly in a pipeline connected endlessly, characterized in that a drive device having a drive motor connected to a corner joint is disposed at a corner of said pipeline to drive a drive sprocket constituting the corner joint to move the disk cable.

13. The feed carrying apparatus according to claim 12, wherein said drive sprocket is so designed that operating plates are secured to both sides of a support having a projecting support shaft, said operating plates being connected together by connecting pins.

14. The feed carrying apparatus according to claim 13, wherein said operating plates have a tooth form whose tooth width gradually becomes wider from a root part to an intermediate part, and whose tooth width gradually becomes narrow from the intermediate part of the crest part, the teeth being formed so that a clearance between the teeth adjacent to each other is larger than the tooth width.

15. A feed carrying apparatus for carrying feed by traveling a disk cable connected endlessly in a pipeline connected endlessly, having a casing formed with a cable introducing port at an upper end of a side wall, a cable discharge port at a bottom wall, and formed with an inclined wall, wherein a drive device having a drive sprocket arranged away from said inclined wall within said casing is disposed at a corner of said pipeline.

16. The feed carrying apparatus according to claim 15, wherein said drive sprocket is secured to a drive motor, and a motor sliding mechanism for sliding the drive motor is disposed.

17. The feed carrying apparatus according to claim 15 or 16, wherein a motor stop mechanism is disposed which moves along with said drive sprocket in a fixed spaced relation, and stops the drive motor at the time of emergency.

* * * * *